United States Patent [19]

Gray

[11] 4,024,006
[45] May 17, 1977

[54] SYSTEM FOR FINISHING PIPES

[75] Inventor: Paul E. Gray, Gnadenhutten, Ohio

[73] Assignee: U.S. Concrete Pipe Co., Cleveland, Ohio

[22] Filed: June 9, 1975

[21] Appl. No.: 584,843

[52] U.S. Cl. .......................... 156/172; 138/DIG. 2; 138/109; 138/129; 156/242; 156/425; 156/456; 156/500; 156/574; 285/DIG. 22; 285/288; 285/423

[51] Int. Cl.$^2$ ..................... F16L 9/14; B31C 13/00

[58] Field of Search .......... 156/169, 172, 173, 187, 156/188, 191, 195, 192, 242, 245, 500, 425, 429, 430, 431, 456, 157, 574; 285/288, 291, 149, 138, 293, DIG. 22, 423, 230, 237; 138/DIG. 2, 109, 120, 129; 214/1 S; 242/7.22; 198/339, 651, 480; 29/429, 430; 269/57, 53

[56] References Cited

UNITED STATES PATENTS

| | | | |
|---|---|---|---|
| 2,029,823 | 2/1936 | Huntley et al. | 198/339 |
| 2,206,267 | 7/1940 | Schutz et al. | 198/651 |
| 2,383,582 | 8/1945 | Barbehenn | 156/191 |
| 3,623,930 | 11/1971 | Grosh | 156/173 |
| 3,730,795 | 5/1973 | Medney et al. | 156/425 |
| 3,848,904 | 11/1974 | Anderson | 285/230 |

*Primary Examiner*—William A. Powell
*Assistant Examiner*—Michael W. Ball
*Attorney, Agent, or Firm*—Cushman, Darby & Cushman

[57] ABSTRACT

A system for finishing conventionally produced clay pipes having plain ends whereby the pipes are successively placed on mandrels which hold the pipes vertically at the bottom thereof on a first urethane table which is indexed successively through a number of stations, for example 60. At one station liquid urethane is poured into a mold formed between the pipe and mandrel to form a urethane collar. The pipes with this collar are successively transferred, to mandrels on one of two identical winding tables which are similarly indexed through a number of stations, for example 20. At a winding station on each winding table strands of fiberglass filaments are helically wound about the lower end of each pipe and the mandrel to form a bell on the pipe end. After curing, the pipes are then removed from the winding tables. Operations of the tables are under the control of a disclosed control circuit.

70 Claims, 41 Drawing Figures

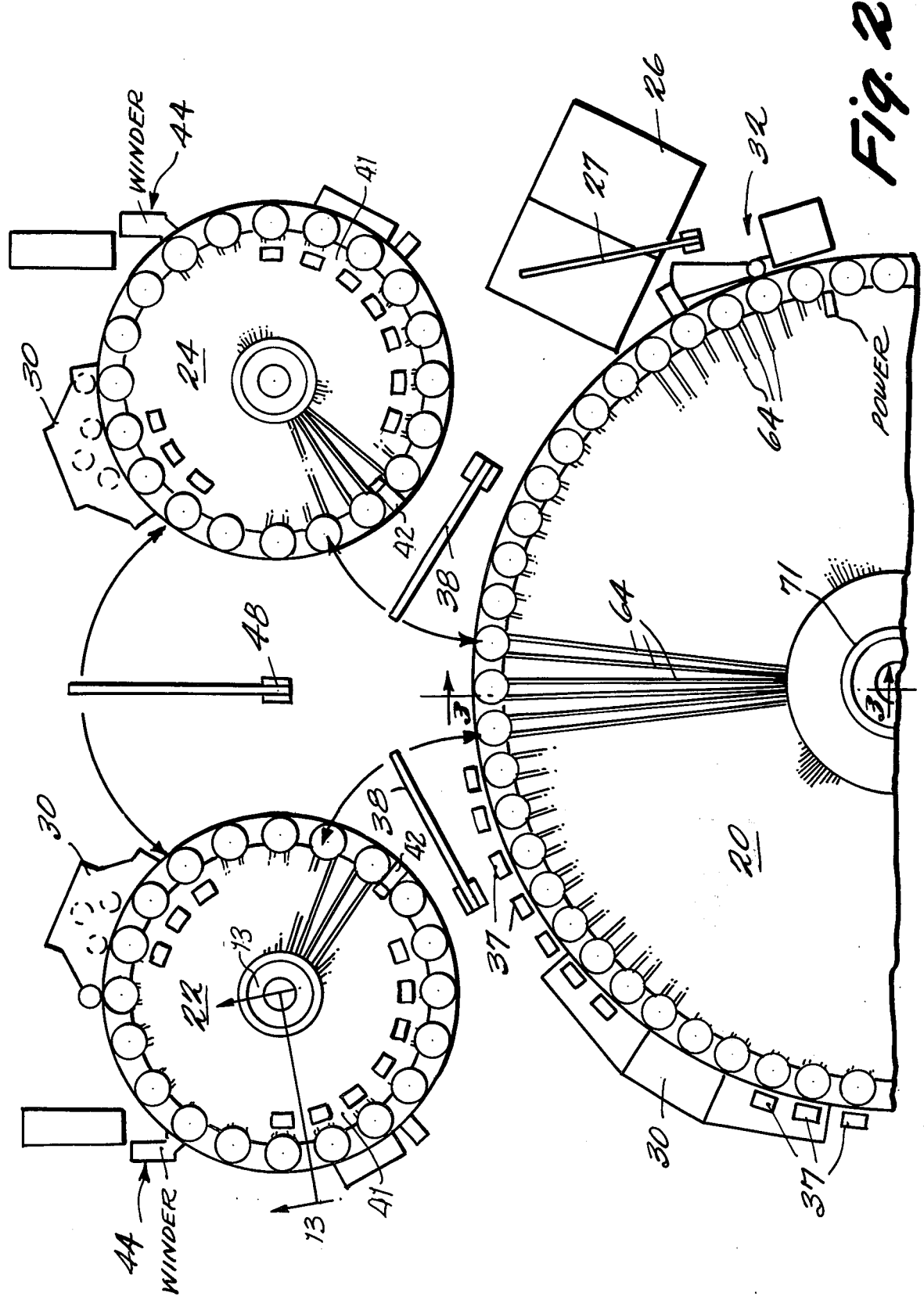

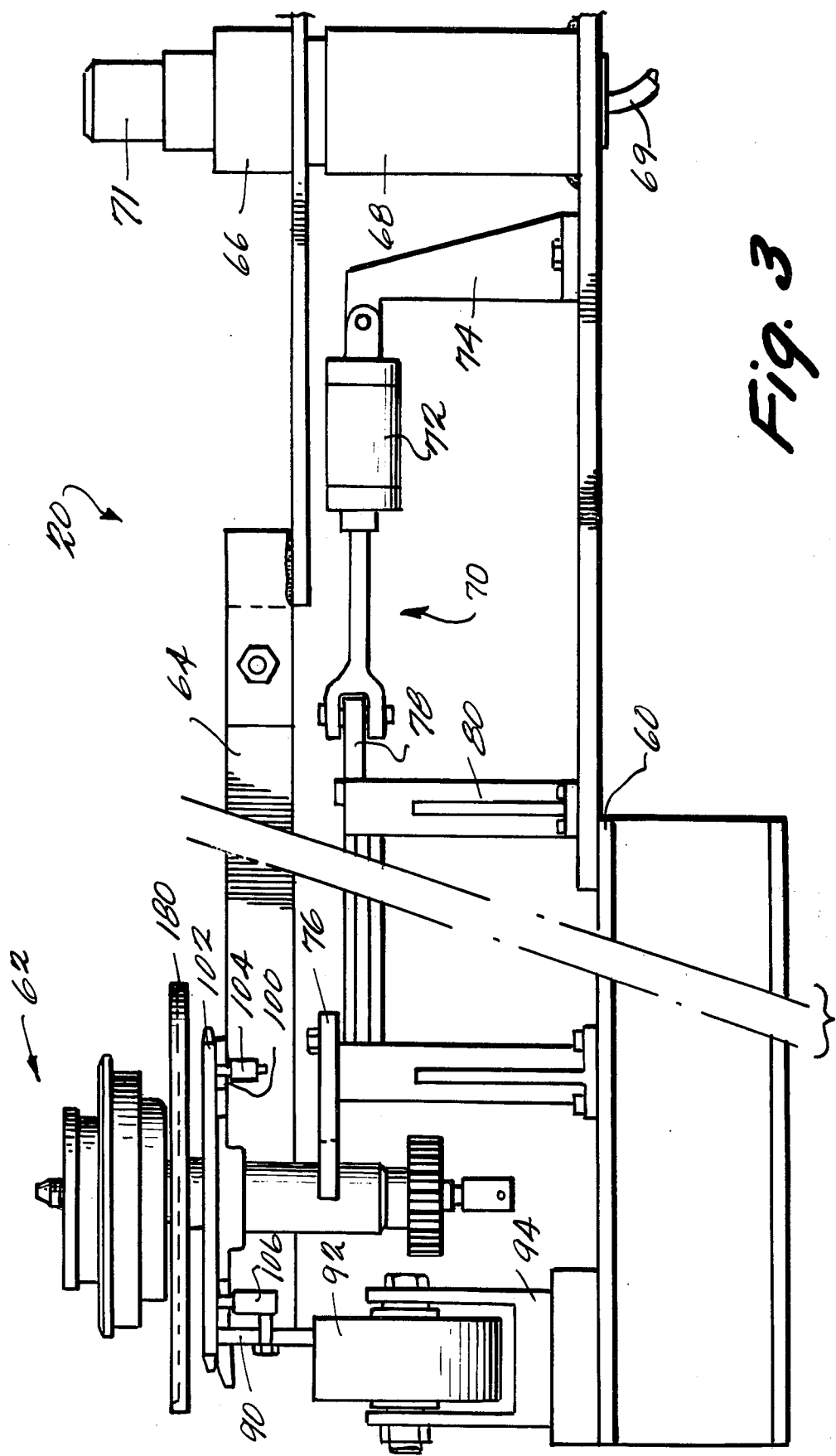

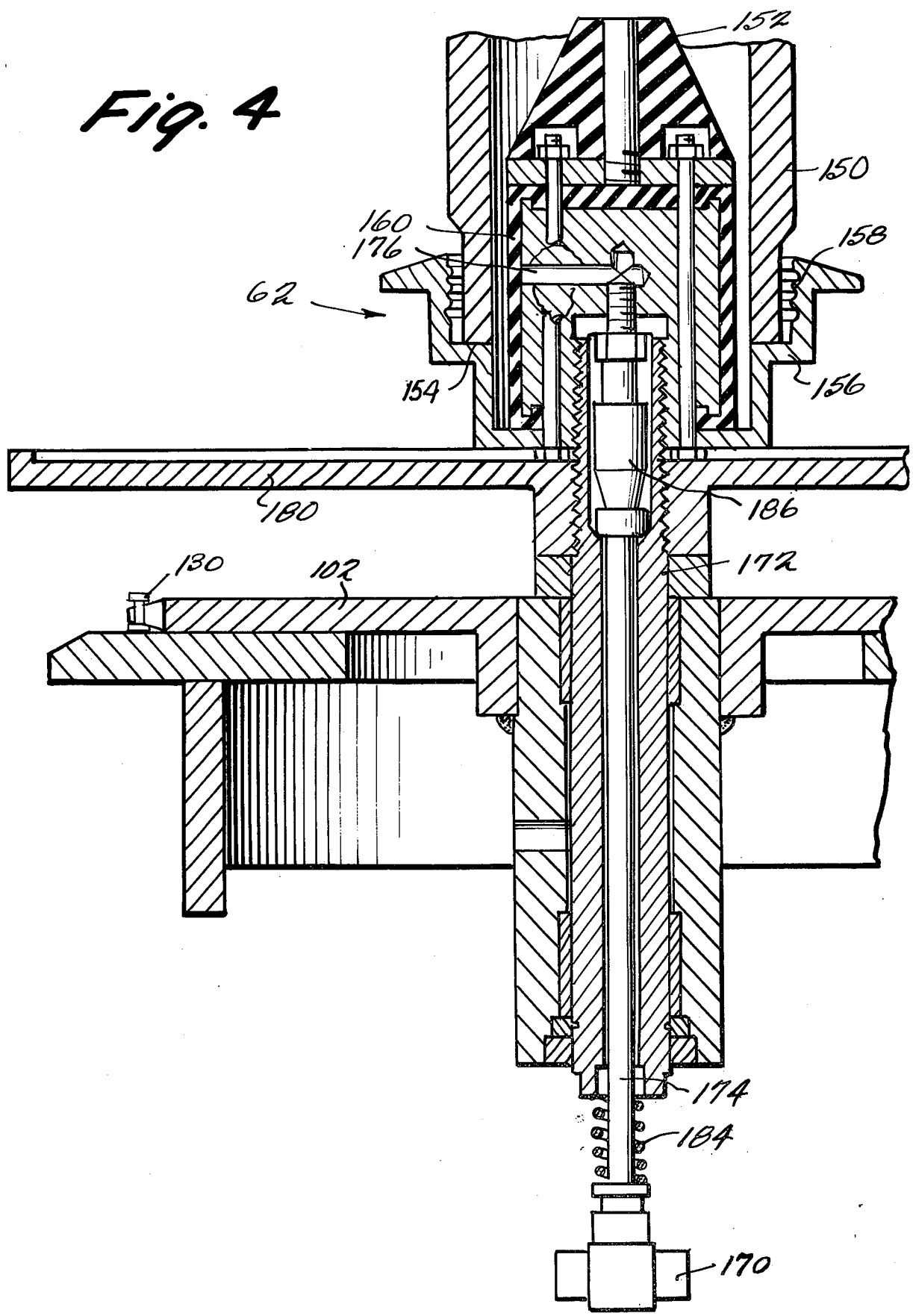

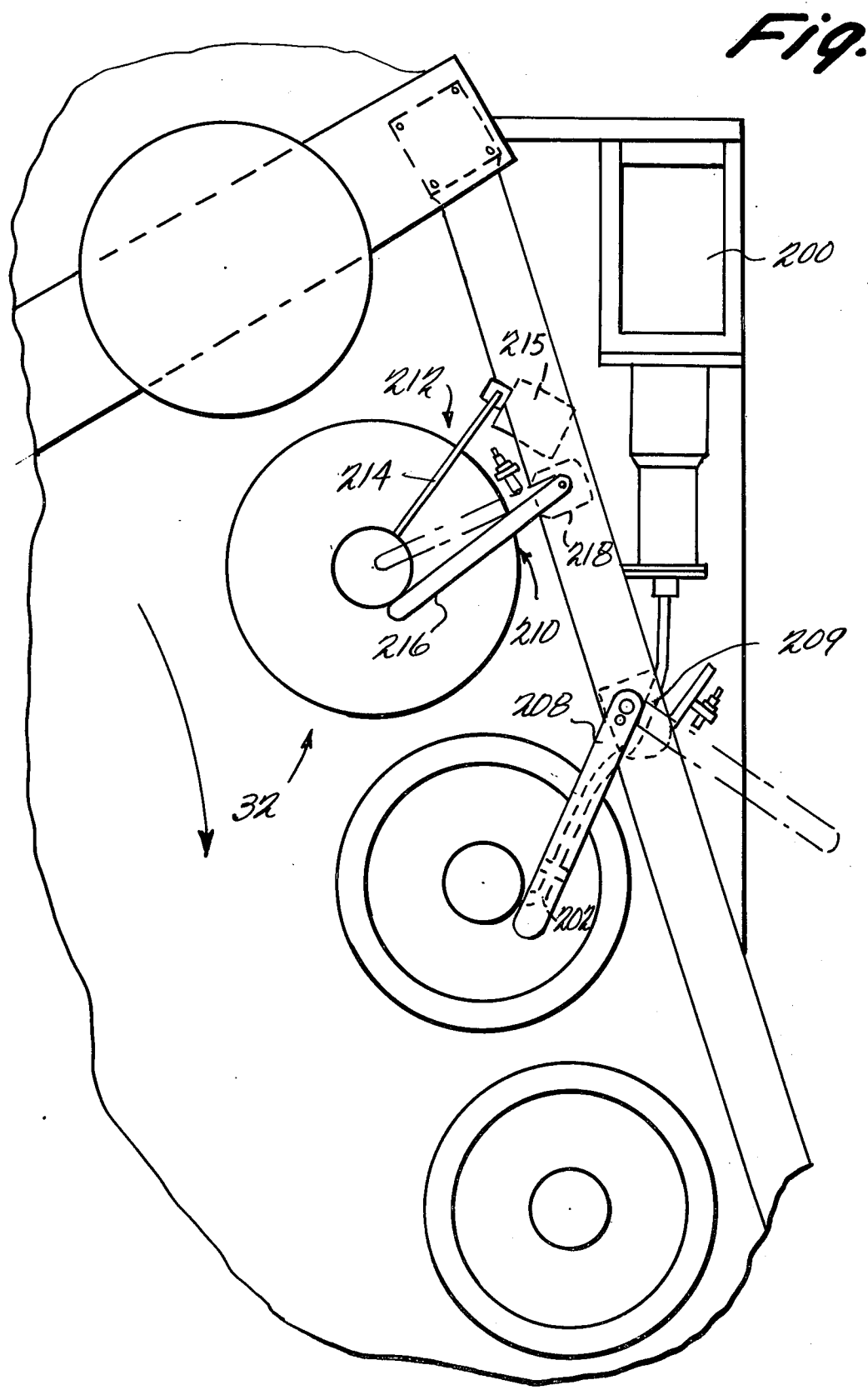

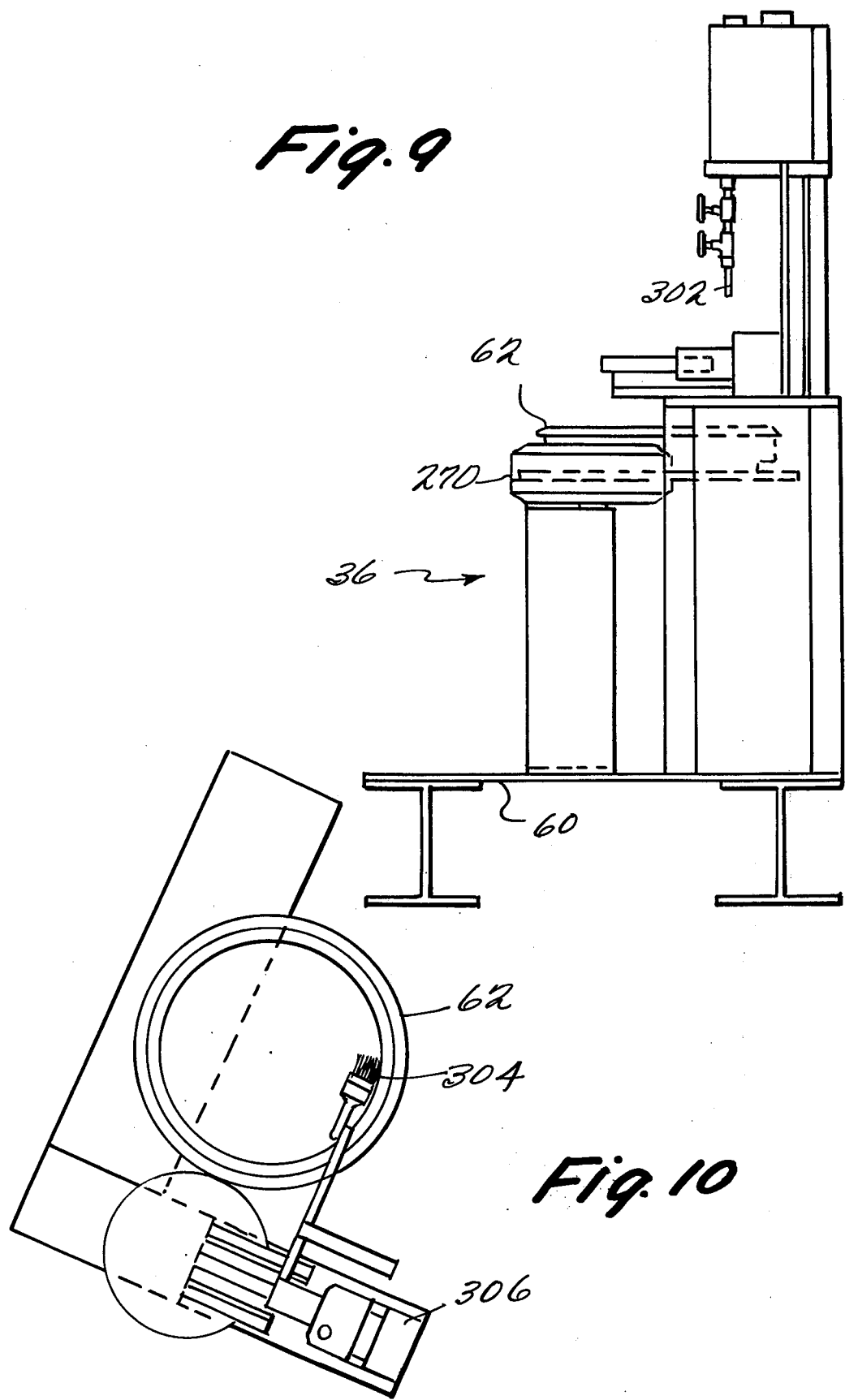

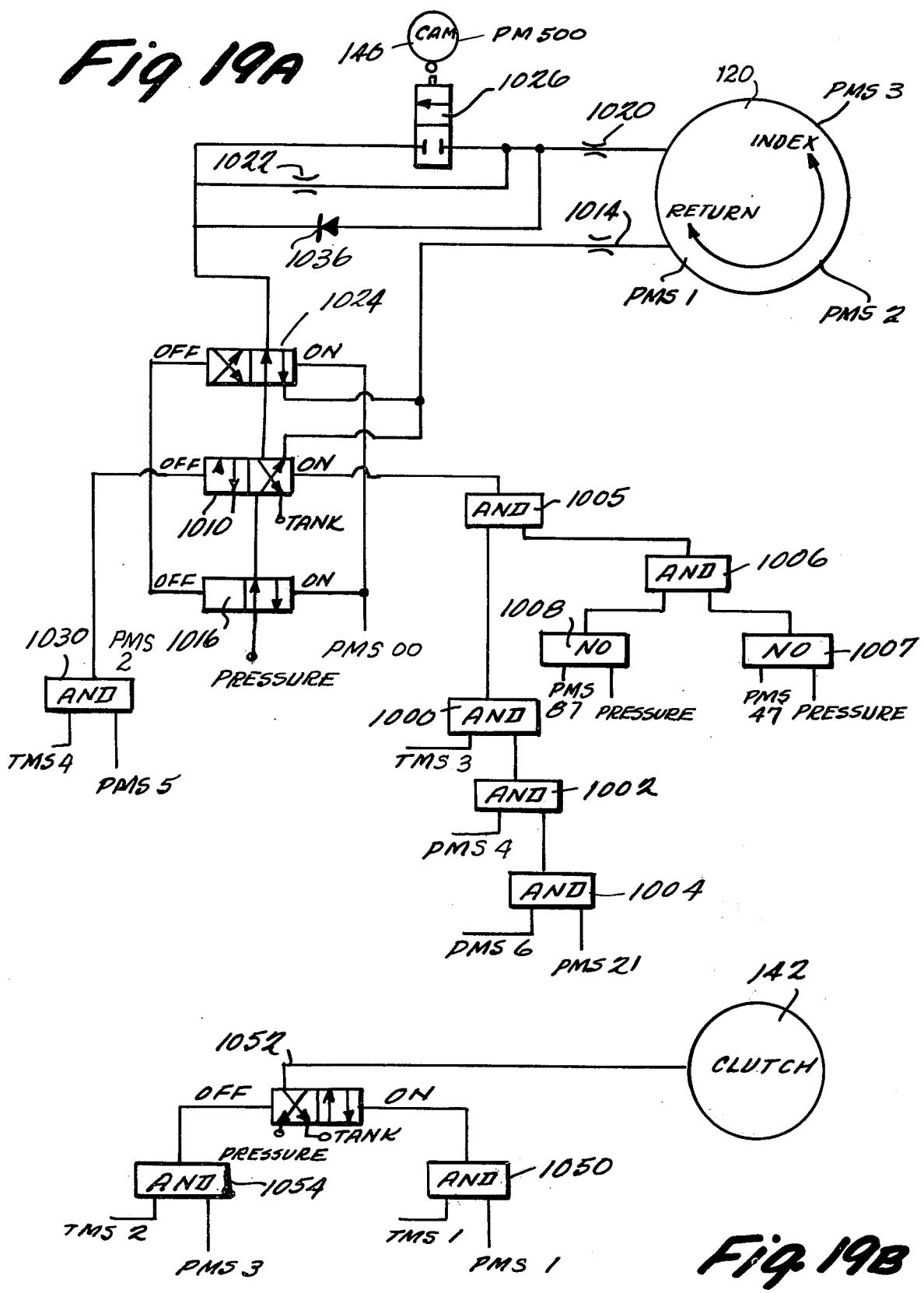

SYSTEM FOR FINISHING PIPES

BRIEF DESCRIPTION OF THE PRIOR ART AND SUMMARY OF THE INVENTION

The invention relates to a system for finishing a conventionally produced piece of clay pipe or the like including forming a bell on one end thereof by helically winding fiberglass filaments or the like about that end.

The clay pipe industry has long been plagued by inumerable problems arising from the manufacture and subsequent treatment of an integral clay socket or bell end of the pipe. It is much easier and less expensive to produce an essentially socketless or plain end tube and thereafter to provide a substitute socket of a different material on the completed pipe in order to provide suitable mating ends for connecting together pipes to form a pipeline.

Another difficulty with conventionally formed clay pipes having integral clay sockets thereon is that for practical reasons the socket must have a substantial thickness. This means that the socket has a considerably greater diameter than the remainder of the pipe. This greater diameter causes difficulties in assemblying pipes since the earth must be excavated to a slightly greater depth where the socket will lay.

U.S. patent application Ser. No. 296,928 filed Oct. 12, 1972 and its continuation, Ser. No. 493,073 filed July 30, 1974, describe a method of producing a clay pipe having a substitute socket or bell end formed on a socketless or plain end clay tube by helically winding filaments, preferably fiberglass filaments, onto a core member such as a mandrel having a removable sleeve inserted into one end of the pipe so that the filaments are wound both about the mandrel and the exterior surface of the pipe adjacent the plain end onto which the socket is to be formed. Preferably the filaments used to helically wind the sockets first pass through a catalyzed resin system so as to be coated with catalyzing gel before being helically wound. Preferably the filaments prior to coating pass through respective promotor and catalyst baths so the catalyst and promoter are mixed as the filaments are helically wound. Thereafter the socket cures automatically with the curing being preferably accelerated, for example by heating, to produce a permanent bell bonded to the pipe. Heating of the pipe may not be necessary particularly where the mandrel is heated or the atmosphere is very warm, e.g. in summer. The resulting bell is much easier to install than a conventional clay pipe bell because its diameter is only slightly greater than the diameter of the pipe, thus making the problem of placing the pipe in the ground much easier. The fiberglass filaments are applied in tension and in fact, after the bell has been cured, it is stronger than a conventionally formed integral clay bell.

The above mentioned applications are not the first proposal to form a bell or socket on a pipe separately from the rest of the pipe. For example, the patent to Barbehenn U.S. Pat. No. 2,383,582 describes a manufacturing technique for bell end pipes in which a strip of green clay pipe is separately wrapped around a green straight piece for a single turn to form the bell. Similarly, fiberglass filaments have been helically wound in the past to form entire pipes. The patents to Grosh U.S. Pat. No. 3,623,930 and Serafino U.S. Pat. No. 3,607,510 describe structures of this type.

The present invention relates to a system for finishing a pipe generally in the fashion described in the above mentioned applications, the disclosures of which are explicitly incorporated herein by reference. This system has a number of substantial advantages which arise out of the arrangement and utilization of various automatic and manually operated pieces of equipment. According to this system as described in detail below, pieces of clay pipe or the like having a straight, socketless end are placed vertically on a first table, termed the urethane table, and indexed successively by that table through a number of work stations. The pipes are placed successively and vertically over a mandrel which includes an air bag which is automatically inflated after a pipe is placed thereon to hold the pipe in place with the mandrel gripping the pipe about the lower end thereof. An air pressure of e.g. 3 psi is preferably maintained in the bag to center the pipe on the mandrel with the control logic causing a higher pressure to be applied at the appropriate time. At one of the stations to which the pipe is indexed after being loaded on the urethane table, an automatic urethane pourer, after determining that a pipe is in place and urethane has not been poured about its mandrel, dispenses liquid urethane from a pouring spout which has been swung into a mold formed between the mandrel and the outer surface of the clay pipe in order to form a urethane collar thereabout which will mate with a fiberglass bell formed on the other end of another pipe. Materials other than urethane such as polyester with a rubber seal, polyvinylchloride or the like can be used.

Mounting the pipes vertically on a urethane table has the substantial advantage that the urethane material flows by gravity in the mold and does not substantially run along the length of the pipe. Vertical mounting also permits the system to easily process different lengths of pipes. During further indexing, the urethane collar cure is accelerated by heat produced by a number of adjacent mounted heaters. The collar will cure automatically and heating may not be necessary. Eventually the pipe reaches an unloading station where it is transferred to one of two or more winding tables by a transfer loader.

The transfer loader couples to the pipe at roughly the center thereof, moves the pipe up and swings it over from the urethane table to one of the winding tables. During the swinging movement the pipe is turned end for end so that the urethane collar is on the uppermost end and the hitherto untreated end is lowest.

The transfer loader then sets the pipe into a mandrel of a winding table at the loading station thereof. This mandrel, similar to the mandrels on the urethane table, grips the pipe about its lower end and the winding table thereafter indexes the pipe successively through a plurality of stations. First, a thin layer of gel coat is applied as a liquid to the lower surface of the pipe and mandrel about the location where the fiberglass filaments will be helically wound. Pouring the gel coat rather than application by a brush permits a satisfactory thickness for the coating. The gel coat forms a bridge across gaps between pipe and mandrel which inevitably occur because clay pipes cannot be made absolutely square on the end. This bridge is necessary to keep the fiberglass strands from pulling into the gap during winding. The gel coat also provides a smooth interior surface for the bell.

After passage by a number of heaters the coated pipe reaches a winding station where a helical winder at least partially under the control of a manual operator helically winds at least two fiberglass bands about the lower plain end of the pipe and the mandrel, forming the bell end generally in the same fashion as in the above described application. The filaments are applied as two intermingled bands which each include several filament rovings passing through baths as described above. The wound socket is cured by the coatings on the filaments and the cure is accelerated as the pipe passes by further heaters. If desired, the pipes can then be transferred to a further table or station to trim excess gel coating and winding resin from the outside end of the socket. The finished pipe can now be removed from the system.

The most frequent cause of breakdown in a system of this sort is breakage of the fiberglass filament rovings or reaching the end of one of the filament rovings which are normally wound on a large spool. Since each of the two bands normally combines several filament rovings from different spools, it is often necessary to stop winding in order to retrieve a broken end or to replace a spool. With a single assembly line each such stoppage requires the entire line to cease operation. However, with the system of this invention which utilizes separate tables, and particularly which utilizes two winding tables, breakage of one of the filaments does not require the entire system to stop. The urethane application table, which normally will operate for a considerable time without any difficulties, can continue operation while a filament is being retrieved or a new spool is being installed. The other winding table will continue operation while a filament is being retrieved or a new spool is being installed. The other winding table will also continue meanwhile to operate and to receive pipes from the urethane table. The urethane table will then in part function to store pipes for the inoperative winding table until it is ready to operate. Preferably the urethane table operates at twice the speed of the two winding tables to provide a steady supply of pipes ready to have the bell end formed thereon by helical fiberglass winding.

Many other products and purposes of the invention will be clear from the following detailed description of the drawings.

BRIEF DESCRIPTION OF THE DRAWINGS

FIG. 2 shows a partial top plan schematic showing the various stations of the urethane and winding tables.

FIG. 3 shows a sectional view through the lines 3—3 in FIG. 2 showing the urethane table.

FIG. 4 shows a sectional view of a mandrel mounting a pipe on the urethane table.

FIG. 7 shows a top view of the urethane pourer.

FIG. 9 shows a side view of the greaser.

FIG. 10 shows a top view of the greaser of FIG. 9.

FIGS. 19A—19G show the control logic for automatically indexing and controlling operation of the urethane table.

FIGS. 21A—21K show the control logic for automatically indexing and controlling operation of a winding table.

FIGS. 22A—22C show the control logic for operating the gel applicator of a winding table.

TABLE OF CONTENTS OF DETAILED DRAWING DESCRIPTION

I — General System Description
II — Urethane Table
III — Transport Loader
IV — Winding Table
V — Control Logic

General System Description

Figure 1:
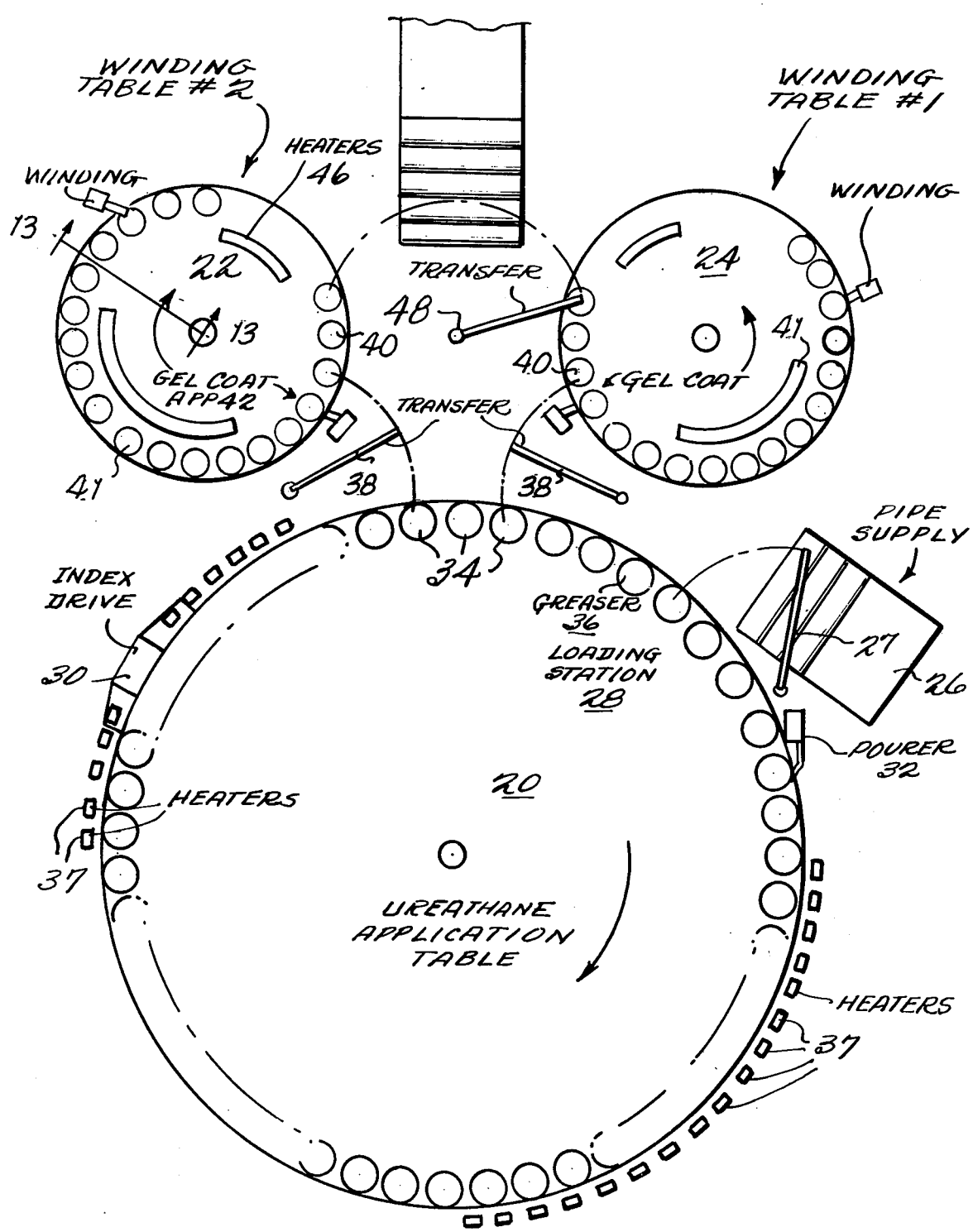
FIG. 1 shows a top plan schematic view of the system of this invention.

Reference is now made to FIGS. 1 and 2 which illustrate schematically one embodiment of the system of this invention for forming about one end of a fired straight piece of clay pipe or the like a fiberglass bell and about the other end a urethane collar or the like to mate with the fiberglass bell of another similarly formed pipe when a pipeline or the like is assembled. The system includes a urethane table generally indicated as 20 and a pair of identical winding tables 22 and 24.

As indicated briefly above, the most frequent cause of stoppage of an assembly line of this type is breakage of one or more of the fiberglass filament rovings which are formed into two strands and helically wound about one end of the clay tube to form the bell. In a single line, breakage of one of these filament rovings necessarily requires stopping the line until the broken end can be retrieved. However, this problem can be resolved, at least in part, by using two separate lines or tables for winding. In the system illustrated in FIGS. 1 and 2, when a winding filament roving on one of the two winding tables 22 or 24 breaks, urethane table 20 can continue operating as can the other winding table. Accordingly production is not completely disrupted for the time that it takes to put the filament winder back into operation.

Clay pipes or the like which have been conventionally prepared are manually brought to the system and stacked as schematically illustrated in FIGS. 1 and 2 on a pallet 26. The system can handle pipes of varying lengths and configurations. The plain end pipes on pallet 26 are successively picked up by a conventional crane 27 or the like, which may be manually or automatically operated, and placed on an empty mandrel, as detailed in FIG. 4, at the loading station 28 of the urethane table 20. The mandrel then automatically grips the pipe around the lower end as an air bag is inflated. This occurs before pouring.

Figure 6:
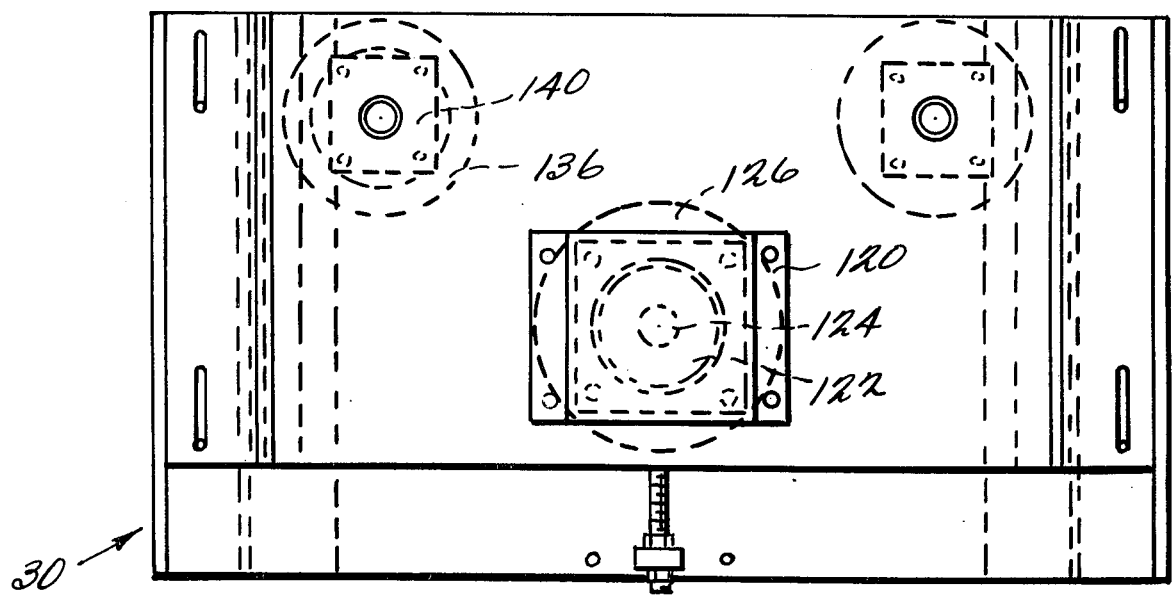
FIG. 6 shows a top view of the drive of FIG. 5.
Figure 5:
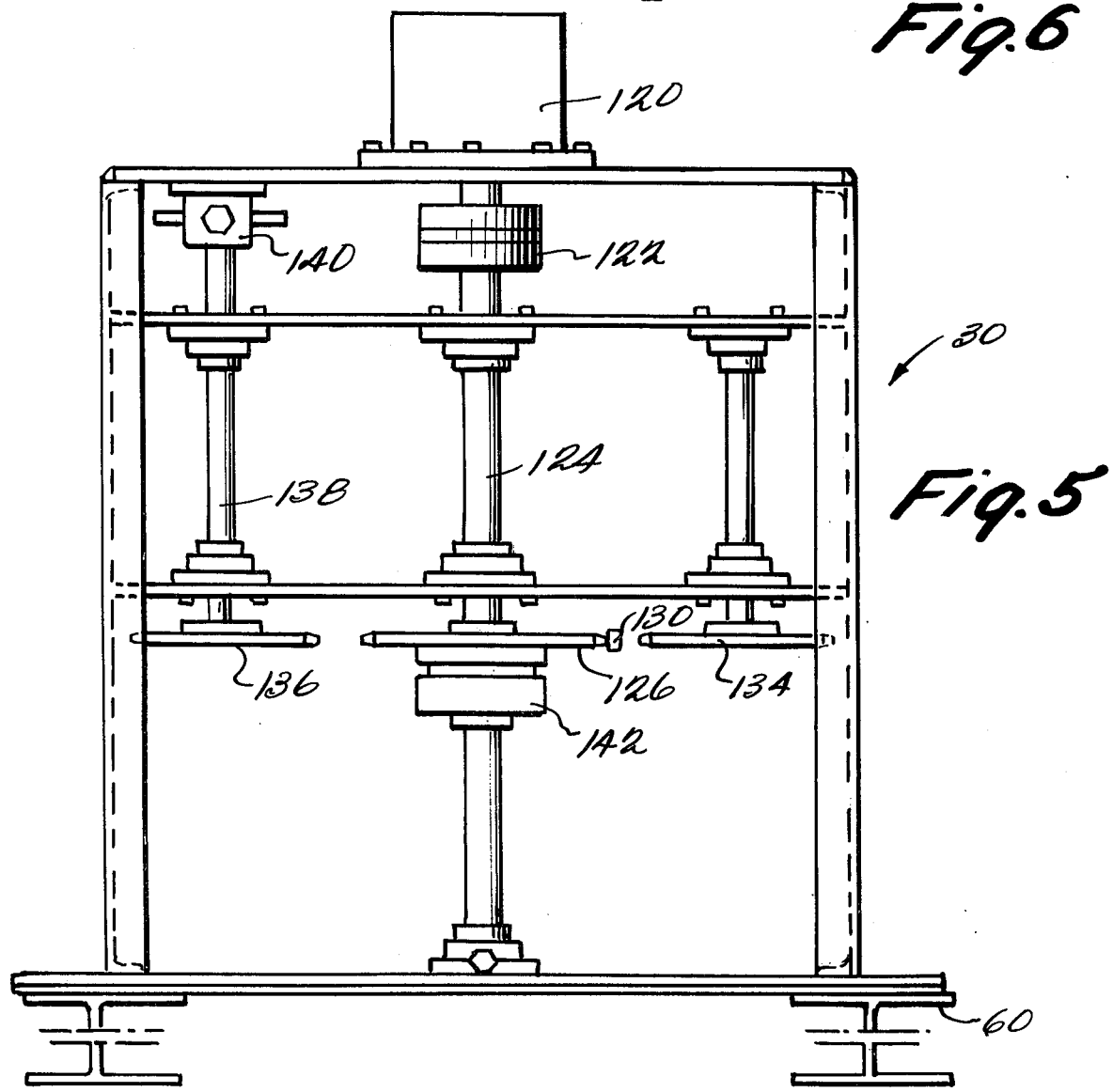
FIG. 5 shows a front view of the indexing drive for both the urethane and winding tables.

Urethane table 20 is periodically indexed through a given angular displacement by an index drive 30, illustrated schematically in FIGS. 1 and 2 and shown in detail in FIGS. 5 and 6. Briefly, index drive 30 includes a motor of the type generally referred to as a rotac, which, under the control of the logic circuitry illustrated in detail in FIG. 19, periodically rotates through a predetermined angle to move a chain which engages sprockets fixed to the table about each of the mandrels of urethane table 20 to index urethane table 20. It has been found convenient to provide 60 stations on the urethane table 20, each mounting a mandrel such as illustrated in FIG. 4, so that with such an arrangement each indexing of table 20 rotates table 20 through an angle of roughly 6°. Preferably the number of stations can be divided into 360 to produce an integral number which is the angular displacement of each index. As will be apparent from the discussion below, indexing of the table is responsive to timing signals which are produced by a timing motor connected to the logic of FIG. 19 (not shown in detail).

After a pipe has been placed by the conventional unloader crane 27 onto loading station 28 of urethane table 20, drive 30 automatically indexes the table to move that pipe to the next station. At a subsequent station reached by the pipe after it has been placed on urethane table 20, a urethane pourer 32 is automatically moved adjacent the pipe and operated to pour liquid urethane into a mold formed about the lower pipe end thereof between the mandrel and pipe to form a urethane collar thereon which will eventually engage the interior of the bell formed on the opposite end of another pipe. The mold has indentations to form sealing beads about the collar periphery. Pouring can take place only if a pipe is present and does not have a collar. Urethane pourer 32 illustrated schematically in FIGS. 1 and 2 is described in detail below with reference to FIG. 7. During the pouring, the mandrel and the pipe held thereon are continuously rotated by a resilient extending flange of the mandrel and which is shown in detail in FIG. 8.

Further indexing of urethane table 20 carries each pipe mounting through a number of stations, for example 45 stations which in effect store pipes ready for winding. Along these stations heaters 37, which may be electrical lamps, gas fired heaters, or otherwise, are mounted in order to accelerate the cure of the urethane collar which has been formed on the lower end of each of the pipes. Other heaters adjustable in heigh heat the end onto which the bell is subsequently formed to condition the pipe for gel application. Eventually the cured pipe reaches one of the unloading stations 34 of urethane table 20 at which position one of the transfer loaders 38 illustrated in detail in FIGS. 11 and 12 automatically moves over the pipe at the unloading stations 34, moves down, grasps that pipe near its middle, moves it up, turns it end for end, and swings in an arc until it is over one of the winding tables 22 or 24. The pipe is then placed on a mandrel of the winding table and grasped by that mandrel. In the system of FIGS. 1 and 2, two transfer loaders are employed to alternately remove pipes from the unloading stations 34. Transfer loader 38 can be adjusted as described below to handle different lengths of pipe. After passing unloading stations 34 each mandrel is greased at station 36 before a new pipe is loaded on that mandrel.

Transfer loader 38 after turning the pipe removed from one of the unloading stations 34 places that pipe on the loading station 40 of either winding table 22 or 24. Since the two winding tables 22 and 24 are identical, further reference in this general description and the detailed description which follows will be only with respect to winding table 22. After the clay or other pipe is properly placed on a mandrel at the loading station 40, such as illustrated in detail in FIG. 13, that pipe is indexed by an indexing drive 30 as illustrated in FIGS. 5 and 6 through each of the stations of winding table 22. It is contemplated that winding table 22 will have fewer stations than urethane table 20, for example 20 stations, and will be indexed once for every two indexes of table 20.

Figure 15:
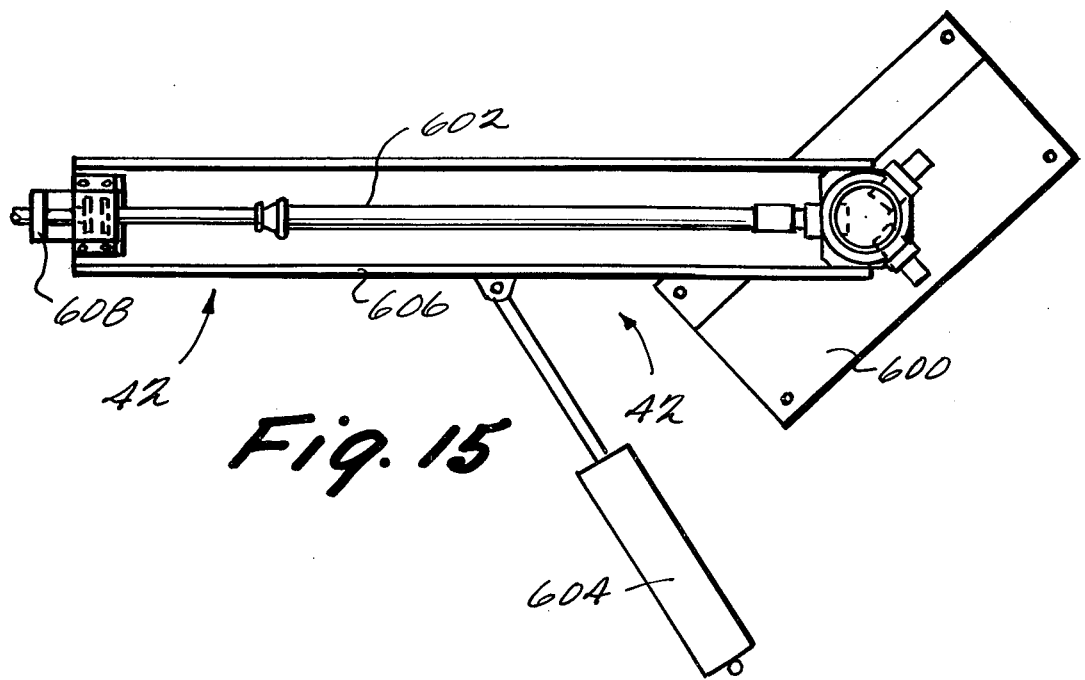
FIG. 15 shows a top view of the gel applicator on the winding table.
Figure 16:
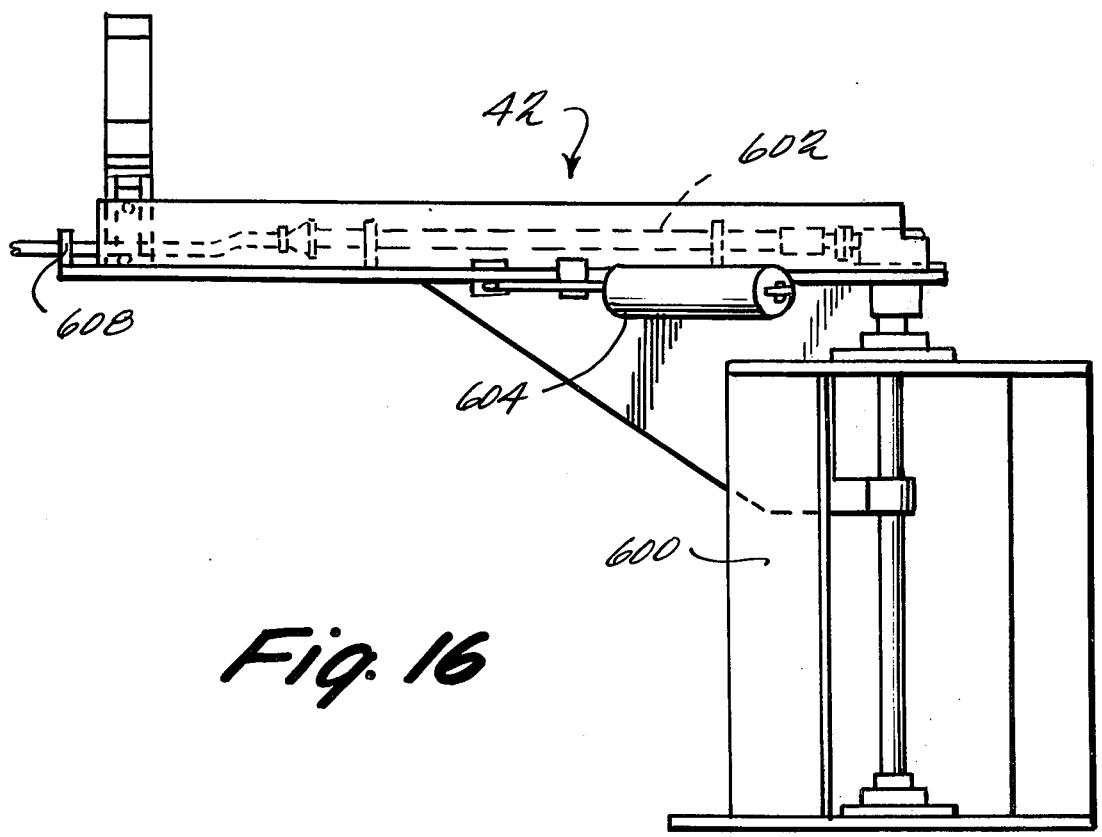
FIG. 16 shows a side view of the applicator of FIG. 15.

The first indexing of winding table 22 carries the pipe placed on a mandrel at the loading station 40 to a gel applicator 42 which applies a chemical gel to the lower surface of the pipe as described above. FIGS. 15 and 16 detail the gel applicator. During the application of the gel, the mandrel and the pipe held thereon are both rotated by the structure which is shown in detail in FIG. 8.

Figure 17:
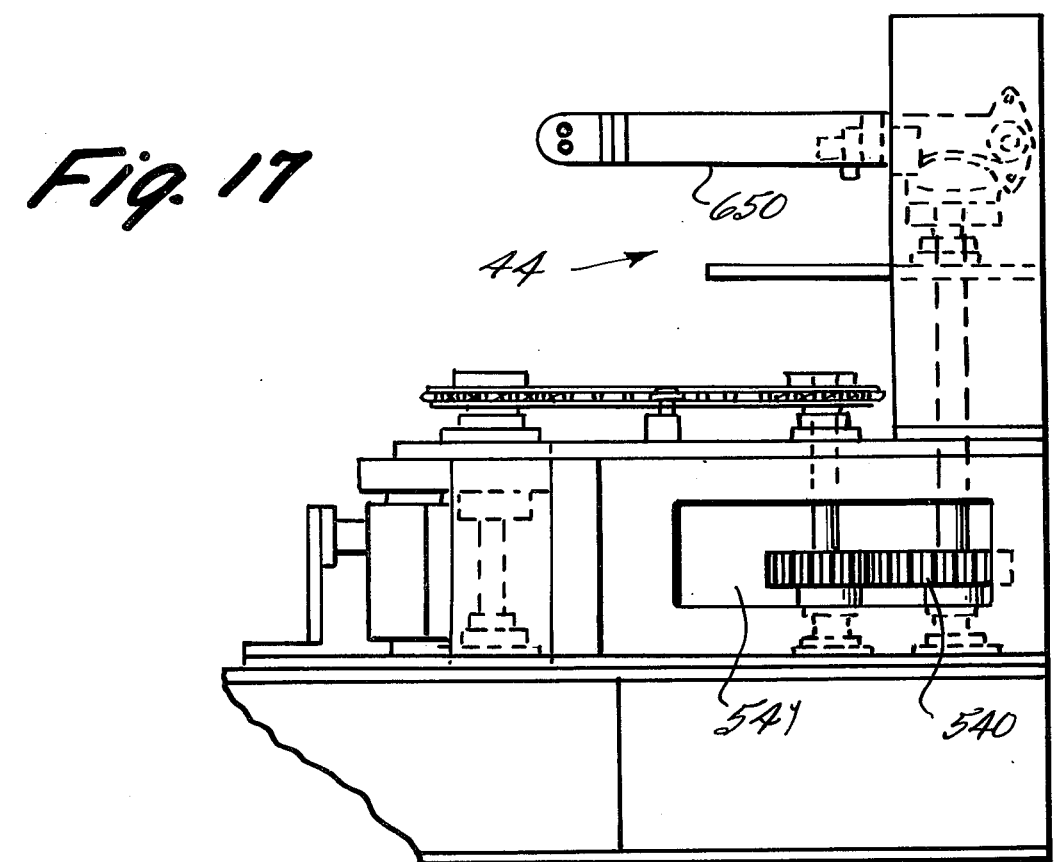
FIG. 17 shows a side view of the winder.
Figure 18:
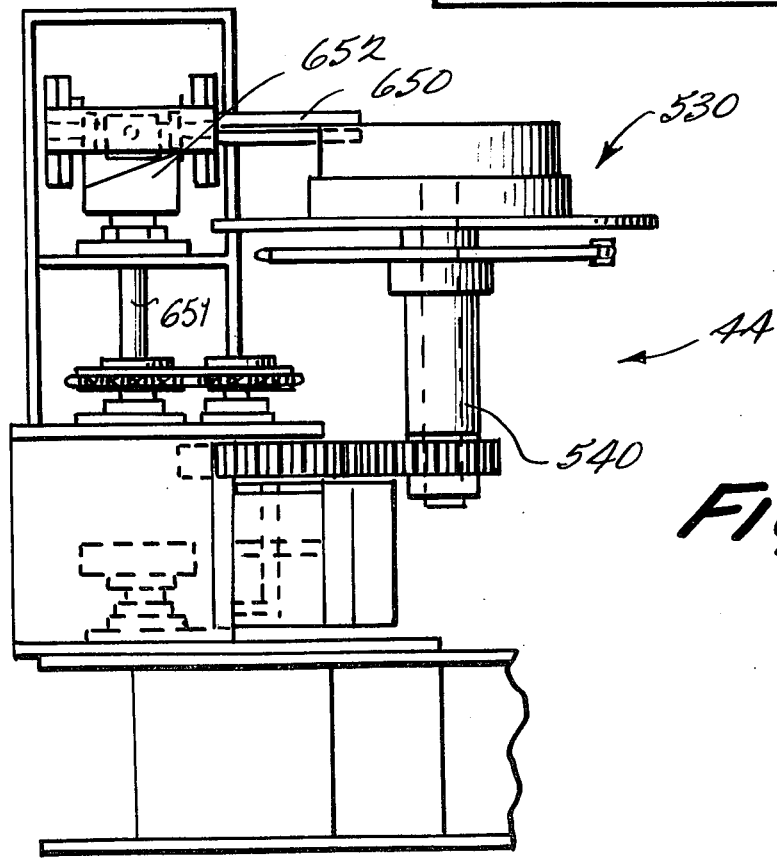
FIG. 18 shows a front view of the winder of FIG. 17.

Next, the pipe with the gel applied thereto is advanced pass a bank of heaters 41 at the mandrel level. Finally it moves through a station at which two bands of fiberglass filament rovings are helically wound about the end pipe, and more particularly about the end and mandrel to form the bell. FIGS. 17 and 18 detail one winder 44. Since the problem of breakage of the fiberglass filaments requires almost constant supervision of the winding, it is economical for the individual who is supervising the winding to cut off the fiberglass filament rovings when the bell has been properly formed and wipe the tail in place.

After passing winder 44, the finished pipes may, if necessary, move past a further bank of heaters 46 to an unloading station where a conventionally operated manual or automatic unloader or crane 48 (not shown in detail) picks off the finished pipes and places them on a suitable pallet where they can be removed from time to time by a truck or the like. The pipes can alternatively be transferred to a further statlion or table (not shown) for trimming excess gel coating and rovings resin from the bell end.

Urethane Table

Reference is now made to FIG. 3 which illustrates a detailed sectional view of urethane table 20 along the lines of 3—3 in FIG. 1. Table 20 includes base 60 formed from a plurality of I beams or the like which are fixed to the floor and about which the mandrels, such as mandrel 62 in FIG. 3, rotate through the various stations as described briefly above. A plurality of arms or ribs 64 are welded or otherwise attached to a central hub 66 which is mounted for rotation about a hollow shaft 68 which is welded to base 60. Preferably one rib is provided for each mandrel. Air line 69 disposed in the center of shaft 68 supplies air to a central air source 71 which is connected to the air clamping bags devices in the system by suitable lines which have been omitted in the Figures for purposes of clarity in illustration.

As discussed briefly above, urethane table 20 is indexed successively through a given angular rotation, for example 6° where urethane table 20 includes 60 stations. In order to insure that the rotation angle is exact and to prevent further rotation between indexing, urethane table 20 includes a locking mechanism 70 which is comprised of a conventional hydraulic cylinder 72 pivotably attached by bracket 74 to base 60 of table 20 and a forked member 76 engaging one of the mandrels of table 20 when hydraulic cylinder 72 is extended in response to the application of hydraulic pressure to one input and which withdraws to a position permitting indexing of table 20 when hydraulic pressure is applied to a second input to cylinder 72, as will be discussed below with regard to the control circuitry of FIG. 19. Arm 78 connects hydraulic cylinder 72 to the forked member 76 and is supported by bracket 80 which permits arm 78 to slide through it to engage and disengage the mandrel.

Each of the ribs or arms 64, preferably each mounting a mandrel, are bolted or otherwise connected to an annular ring 90 which rides on resilient rollers 92, which may be rubber tires or the like. Roller 92 thus provides support for the mandrels as they rotate during the indexing of the urethane table. Rollers 92 are rotatably mounted on base 60 by a bracket 94 which permits free rotation thereof.

Annular ring 90 is L-shaped in a cross section and has an annular slot 100 through the horizontal surface through which mandrels 62 extend as can be seen in FIG. 3. Each mandrel 62 includes a sprocket 102 which is bolted to the annular horizontal surface of ring 90 and also to bosses 104 and 106 which are welded or otherwise attached to the respective sixty ribs 64. Bosses 104 and 106 and the similar bosses for the other mandrels are also bolted directly to the vertical surface of the annular ring 90 which rides on rollers 64. Alternately, ribs 64 can be welded to ring 90.

Reference is now made to FIGS. 5 and 6 which illustrate in detail the indexing drive 30 for urethane table 20 which is illustrated in FIG. 3. The indexing drive for each of the winding tables is essentially the same as the arrangement in FIGS. 5 and 6 except in size and accordingly has not been depicted in detail. Indexing drive 30 is mounted on base 60 of urethane table 20 and as can be seen schematically in FIG. 2, is mounted adjacent to the edge of the table. Drive 30 includes a hydraulic motor 120 of the type generally referred to as "rotac" and which responds to properly applied hydraulic pressure by rotating through a predetermined angle. The operation of rotac 120 is described in greater detail below with respect to FIG. 19.

Rotac 120 applies a rotating torque through coupler 122 to shaft 124. Shaft 124 rotates spocket 126 which engages a chain which in turn engages each of the sprockets 102 respectively fixed to ribs 64 of table 20. Accordingly, when sprocket 126 is rotated to advance chain 130 which it engages, chain 130 pulls on the fixed sprocket 102 and causes the entire urethane table 20 to rotate through a predetermined angle. Chain 130 also engages sprockets 134 and 136 which make chain 130 fit properly around sprockets 102. Sprocket 136 drives, through shaft 138, a cam 140 which provides a hydraulic signal at a certain point during its rotation for control purposes as described below with reference to FIG. 19. Air clutch 142 couples and uncouples shaft 124 to sprocket 126 so that when clutch 142 is activated, rotac 120 can index table 20 and is thereafter prevented from returning to its initial position and accordingly prevented from further indexing urethane table 20 until after table 20 is locked. The purpose of clutch 142 will be also further apparent from the discussion of FIG. 19 below.

Reference is now made to FIG. 4 which illustrates a sectional view of one of the mandrels 62 mounted on table 20. The mandrels can be easily charged to handle different pipe diameters. As the pipe is initially placed on the mandrel, it is guided into place by an elastic, preferably urethane, leadin member 152. Pipe 150 sets on one end of a horizontal step 154 of an annular ring member 156. A mold for the urethane is formed in the annular space 158 between ring 154 and pipe 150. The mold has indentations to form beads on the periphery of the collar. Bag 160 is partially inflated to help center pipe 150 and is then fully inflated by conventional quick connect valve 186 which supplies air to air bag 160 to cause bag 160 to expand and to firmly contact the interior annular surface of pipe 150 and to lock the pipe onto mandrel 62. This inflation is caused by the control logic illustrated in detail in FIG. 19.

Air is supplied from source 71 to valve 170 which connects to mandrel 62 in FIG. 4. Spring 184 ensures that quick connect valve 186 will uncouple after the bag has been inflated or deflated. The air path then flows through the tube 174 in the interior of shaft 172 and through passage 176 to expand air bag 160 when quick connect valve 186 operates. Flange 180 is threaded to the central shaft 172 so that when rotor 270 illustrated in FIG. 8 engages flange 180 that flange and the mandrel 62 are rotated as well as the pipe 150 setting thereon. This rotation occurs at the pouring and stations on the urethane and winding tables.

Reference is now made to FIG. 7 which illustrates in detail pourer 32. Referring again to the schematic of FIG. 2, after the pipe is loaded onto urethane table 20 at loading station 28, it is indexed to a pouring station where liquid urethane is poured into the space 158 between the outside of the pipe 150 and step 154. This pouring is under the control of logic which is illustrated in detail in FIG. 20 and described below. Referring again to FIG. 7, pourer 32 includes mixing chamber 200 where the appropriate urethane components are brought together and suitably mixed under pressure or otherwise. Mixing chamber 200 has connected to its output a pouring tube or spout 202 which can be moved toward and away from pipe 150 on an arm 208 which is under the control of a rotac which is mounted below arm 208, as described below with reference to FIG. 20. When the pouring tube 202 is in the position illustrated, urethane liquid can be dispensed so as to flow into the space 158 in FIG. 4 and fill the same.

Sensor 210 in FIG. 7 senses whether a pipe is present at the station just before the pouring station and sensor 212 senses whether pouring has occured. An arm 214 is advanced and withdrawn by an air rotac 215 described with reference to FIG. 20C. Arm 216 is advanced and withdrawn by an air rotac 218 to close a switch as described below if a pipe is not present.

Figure 8:
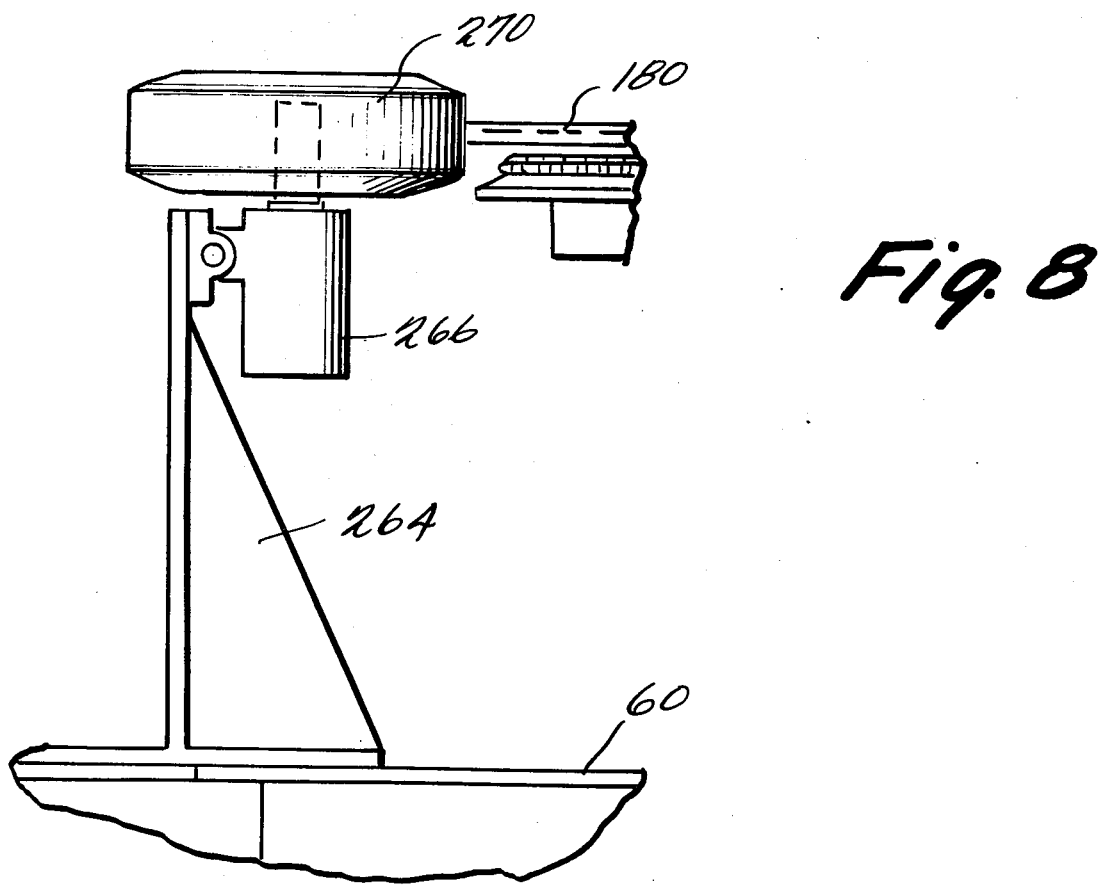
FIG. 8 shows a side view of the mandrel rotating apparatus.
Figure 14:
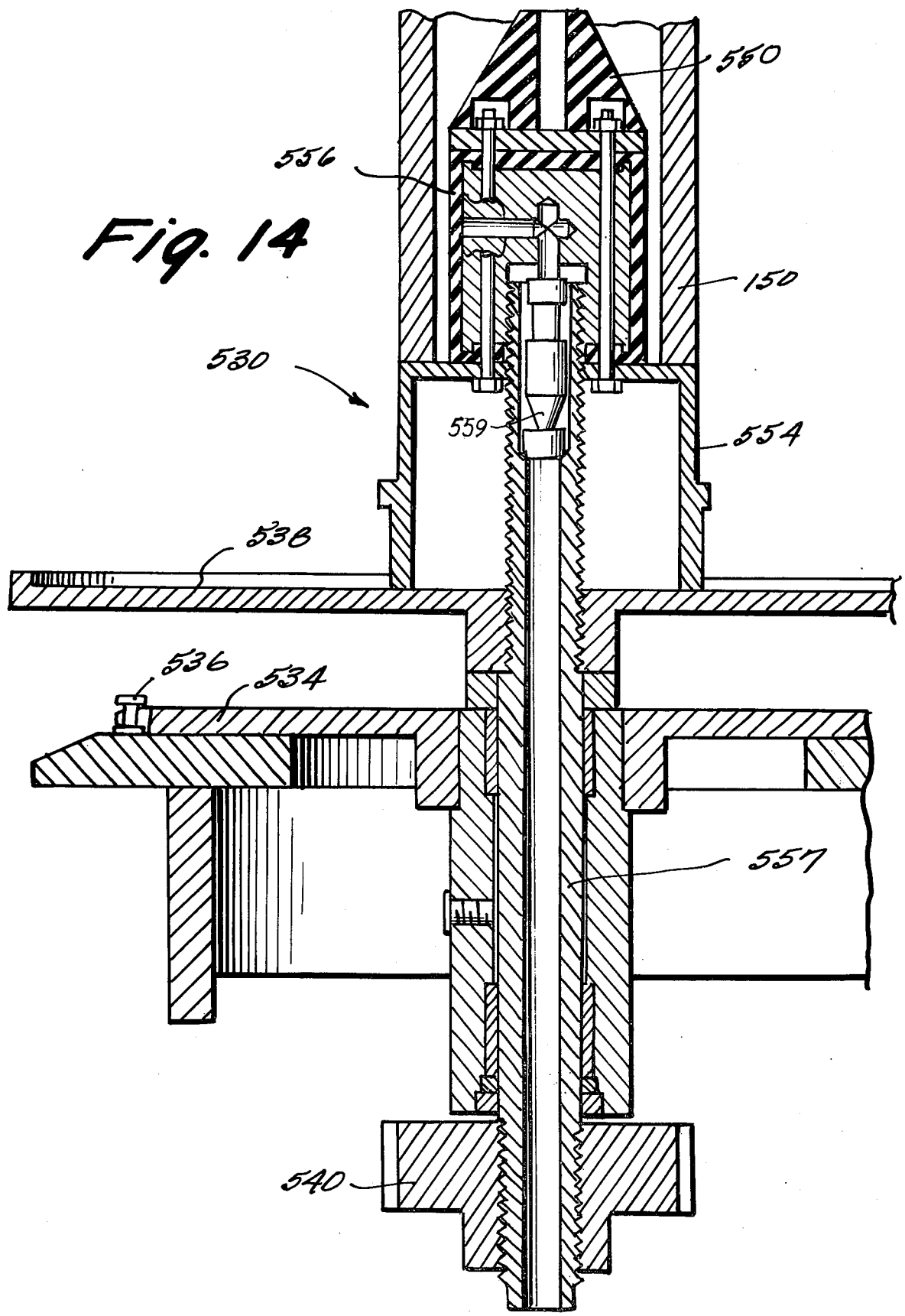
FIG. 14 shows a sectional view of a mandrel supporting a pipe on the winding table.

Reference is now made to FIG. 8 which illustrates in detail the structure which engages flange 180 of mandrel 62, as well as the mandrels of winding table 22 illustrated in FIG. 14, to rotate the same at certain stations, namely the urethane pouring station, and the gel applying station respectively on the urethane table 20 and the winding tables 22 and 24. The structure illustrated in FIG. 8 is fixedly attached to base 60 of table 20 by a bracket 264. A conventional hydraulic motor 266 is attached to bracket 264 and rotates a rubber tire or similar elastic member 270 which engages, as illustrated, flange 180 of a mandrel 62 of FIG. 4 or the flange of winding table mandrel 530 described with respect to FIG. 14.

Reference is now made to FIGS. 9 and 10 which detail grease 36. A suitable greaser under pressure flows through line 302 to brush 304 which applies the grease to the interior of mandrel 62 as it is rotated by motor 266 detailed in FIG. 8. Rotac 306 advances and retracts brush 304. The unit is mounted on base 60.

Transfer Loader

Figure 12:
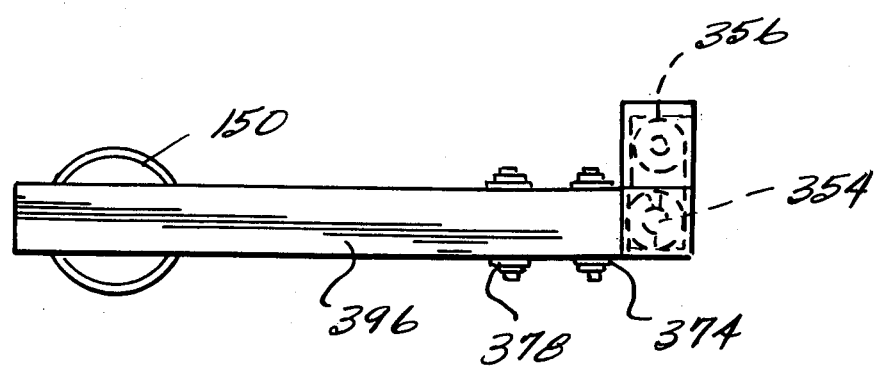
FIG. 12 shows a top view of the transfer loader of FIG. 11.
Figure 11:
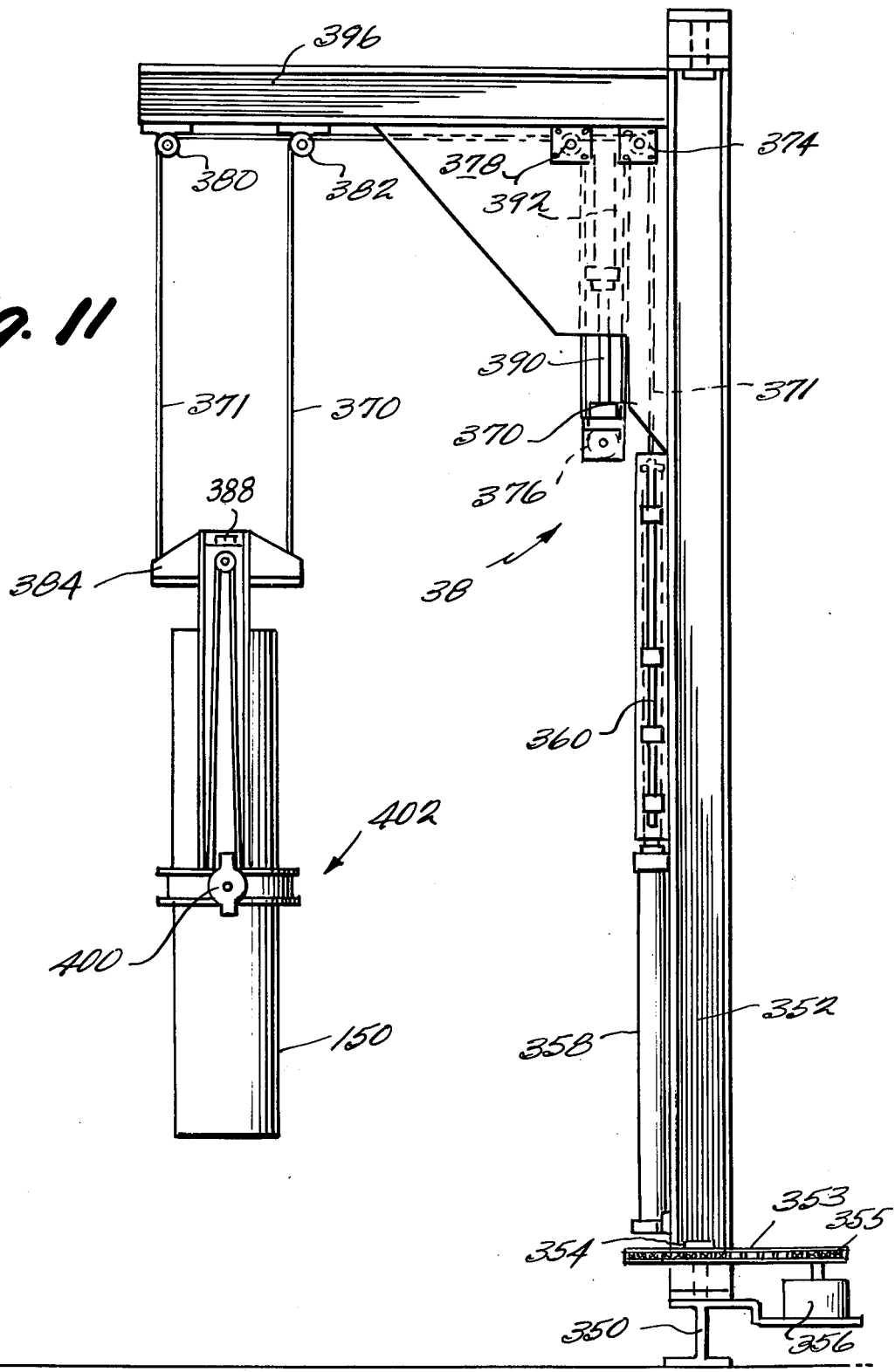
FIG. 11 shows a side view of the transfer loader.

When a pipe reaches one of the unloading stations 34, (pipes being taken from the two stations alternatively), transfer loader 38 automatically picks up the pipe from an unloading station 34, turns that pipe over and places it on the loading station of winding table 22 or 24. The air bag 160 is now fully deflated so that the pipe can be stripped from mandrel 62. Referring to FIGS. 11 and 12, transfer loader 38 comprises a fixed base 350 upon which vertical beam 352 is pivotably mounted about pin 354 for swinging movement between urethane table 20 and winding table 22 or 24. Hydraulic rotating device 356 functions under the control of the logic circuitry described in detail in FIG. 21 to rotate beam 352 via sprockets 353 and 355. Hydraulic strip cylinder 358 is fixedly attached to vertical beam 352 and piston 360 of hydraulic cylinder 358 is connected at the end thereof to chains 370 and 371 for moving pipe 150 vertically as it is respectively lifted off urethane table 20 and placed onto winding table 22 or 24. Chains 370 and 371 pass about shaft 374, sprocket 376, shaft 378, and shafts 380 and 382 respectively. Chains 370 and 371 then respectively connect to opposite sides of bracket 384 which mounts a hydraulic rotac or other device 388. Sprocket 376 is attached to piston 390 of hydraulic cylinder 392 which is in turn fixedly attached to the horizontal beam 396 on which shafts 374, 378, 382 and 380 and sprocket 376 are mounted. To handle different pipe lengths the vertical travel of bracket 384, which mounts rotac 388, can thus be shifted by adjusting the cylinder stroke of cylinder 392 and accordingly the position of piston 390 and sprocket 376.

Rotac 388 is connected to at least one sprocket 400 of the air clamp 402 which includes at least one elastic air bag extending about the periphery of pipe 150 near the center. Additional air bags can be used to support pipe 150. This air bag is inflated after clamp 402 has passed over the top of the pipe to firmly lock transfer loader 38 to pipe 150 and to permit it to be raised, swung end for end and lowered into place. Operation of rotac 388 rotates the pipe 150, completely flipping it over until the end opposite the end to which the urethane collar has been attached is on the bottom, ready for having a fiberglass bell helically wound about it as described in detail below.

Winding Table

Figure 13:
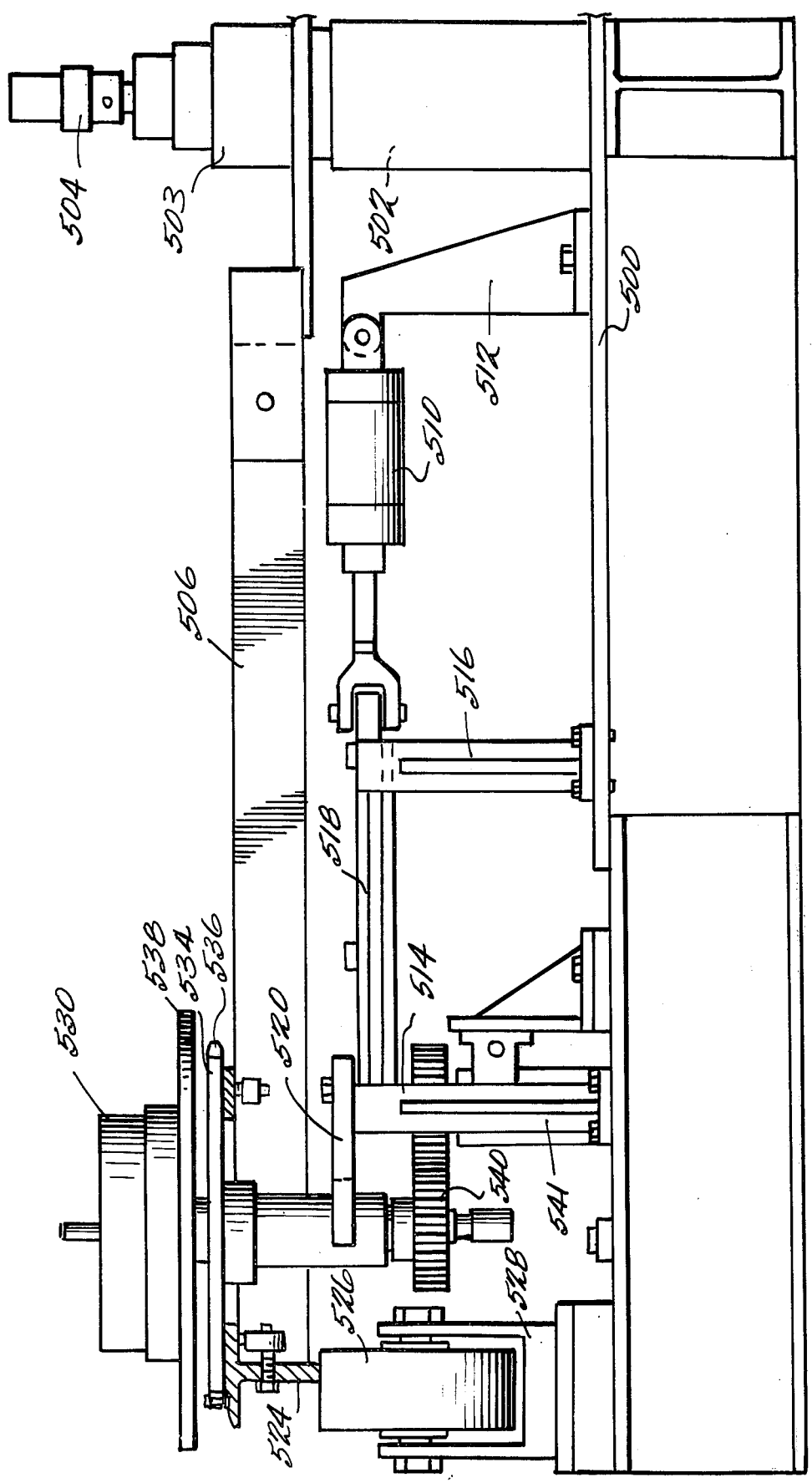
FIG. 13 shows a sectional view of the winding table along the lines 13—13 in FIG. 2.

FIG. 13 illustrates a cross sectional view of winding table 22 along the lines 13—13 in FIG. 2. Winding table 22 includes a fixed base 500 about which is mounted a hollow shaft 502 which rotatably mounts hub 503. Shaft 502 includes in the center thereof an air line which connects an air source (not shown) to the general air source 504 which supplies air pressure to the air bags.

In the same fashion as the urethane table 20, winding table 22 includes a plurality of thin ribs 506 which are welded to annular hub 503 which is mounted for rotation with respect to the base 500. The locking mechanism for the winding table includes hydraulic cylinder 510 which is pivotally attached to base by bracket 512 and which includes forked support arms 514 and 516 as well as arm 518 which connects cylinder 510 to the forked lock arm 520. Application of pressure to the two respective inputs to hydraulic cylinder 510 causes the locking arm 520 to be respectively withdrawn and advanced.

Annular, L-shaped ring 524 rides on a plurality of rollers 526 which are each mounted in bracket 528 for rotation with respect to that bracket and to support the mandrels, such as mandrel 530 as they are rotated through respective stations of winding table 22. Sprockets 534 of mandrel 530 is fixed to rib 506 and engages a chain 536 driven by an index drive 30 of the type illustrated in FIGS. 5 and 6 to advance winding table 22 successively through the respective stations. Flange 538 engages a rotor or the like as illustrated in FIG. 8 to rotate the mandrel at the gel applicator 42 of winding table 22.

However, at the winding station, mandrel 530 is not rotated by structure as illustrated in FIG. 8, but rather a separate motor 541 mounted on base 500 engages gear 540 of the mandrel 530 to rotate the same under the control of the winding operator as described in greater detail below. Positive rotation ensure that the helical pattern will be correctly applied.

Referring now to FIG. 14, mandrel 530, like mandrel 62, includes a leadin urethane element 550 which guides pipe 150 into position on a horizontal step of member 554. Air bag 556 is partially inflated by the air applied thereto through hollow shaft 557, e.g. at 3 psi, to guide pipe 150 onto mandrel 530 and then fully inflated e.g. at 15 psi to hold the pipe 150 firmly in place on member 554 during winding. The air is applied by the control logic shown in FIG. 21, and quick connect valve 559 operates the same as valve 186 in FIG. 4. As indicated above, flange 538 engages rotor 270 of the FIG. 8 structure at the gel applying station and sprocket 534 engages chain 536 to index the winding table 22 through its respective stations. Gear 540 engages motor 541 shown in FIG. 13 to rotate the mandrel during winding.

Reference is now made to FIGS. 15 and 16 which illustrate gel applicator 42. Applicator 42 is mounted on base 600 and includes a static mixer line 602 with an air cylinder 604 engaging the frame 606 which supports line 602 to turn the frame 606 in and out, toward and away from the pipe 150. When gel applicator 42 is in position, the gel pours from spout 608 about the rotating pipe 150 to apply a conventional gel to the lower end of the pipe 150, mandrel 530 and any gaps therebetween which will subsequently cure. The cure can be accelerated if desired by the application of heat.

FIGS. 17 and 18 illustrate winder 44. Arm 650 wraps two bands of fiberglass filament rovings, each band being comprised of a plurality of filament rovings, about mandrel 530 to form the fiberglass bell. Each band passes through a separate bath, one through a promoter and one a catalyst prior to winding. When the two bands are wrapped about the mandrel 530, pipe 150 and any gaps therebetween, intermingled, the coatings on the bands produce a chemical reaction which cures the bell. Hydraulic motor 541 in addition rotating mandrel 530 by way of gear 540 in addition rotates shaft 651 which mounts cam 652 and which causes the arm 650 to reciprocate up and down and to evenly and helically wind the bands. Heater 46 in FIG. 1 accelerates curing. The operator of the winding machine can at the appropriate time terminate the winding operation or it can be ended by counting the windings and automatically terminating winding, leaving the operator to cut the bands and tuck in the tail.

Control Logic

Reference is now made to FIG. 19 which illustrates the control logic for indexing urethane table 20 and carrying out the various operations thereon. While the logic illustrated in air powered, electrically operated logic can be alternatively employed. Referring particularly to FIG. 19A, rotac 120, as shown in FIGS. 5 and 6, functions to rotate through a predetermined angle to cause the successive indexing of urethane table 20 through a given angular displacement, for example 6°. Before each indexing of rotac 120, the logic circuit illustrated in FIG. 19A checks a number of conditions to make sure that all of the various parts of urethane table 20 are functioning correctly, and that the proper time has come in the timing cycle for indexing to occur.

Figure 19C:
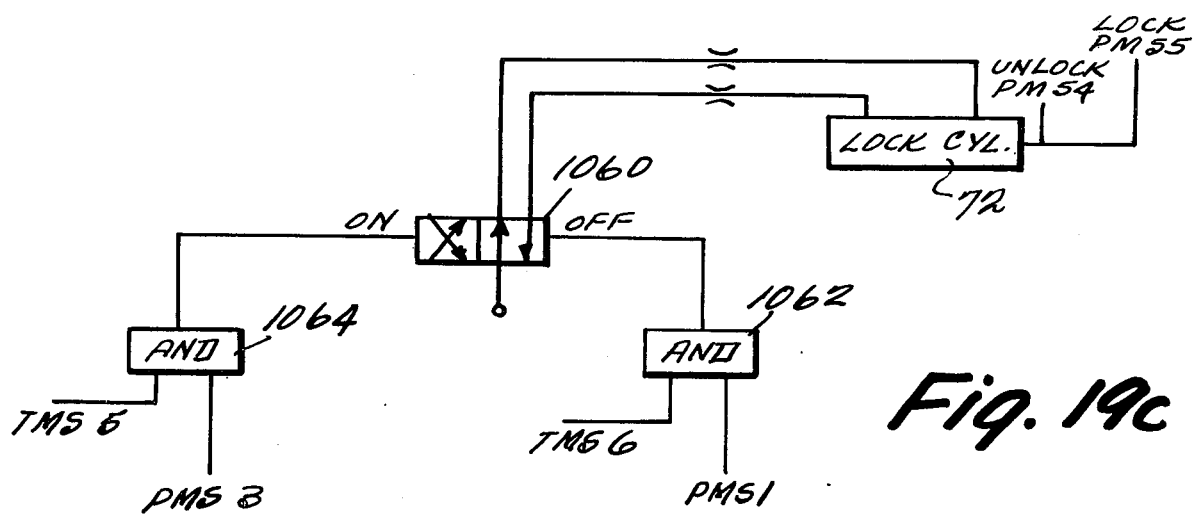
Figure 19D:
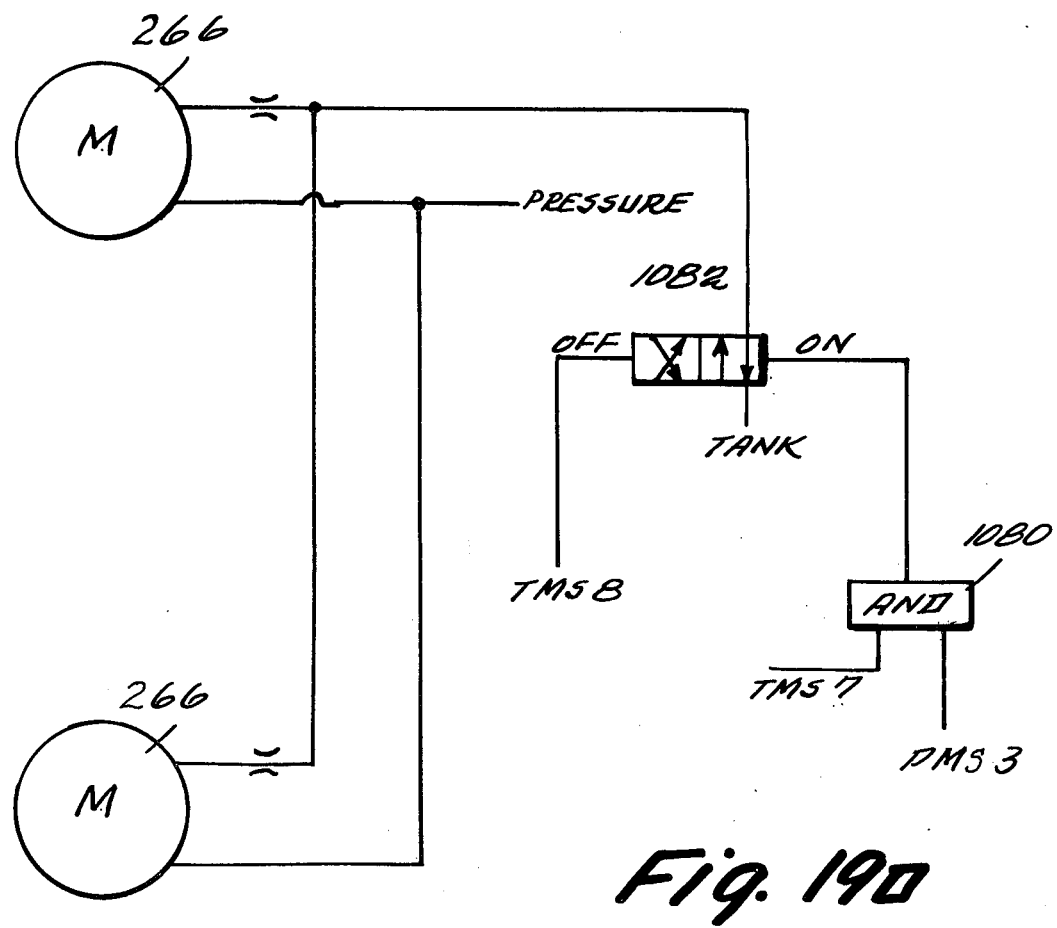
Figure 19E:
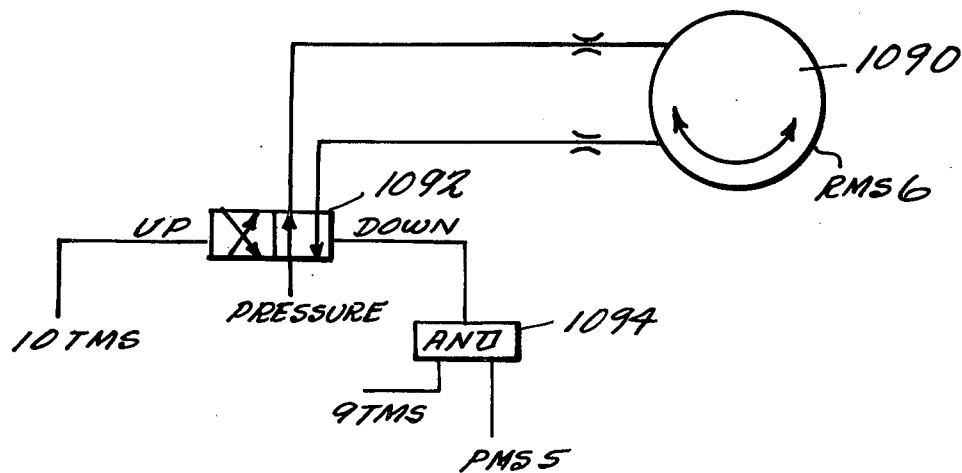
Figure 19F:
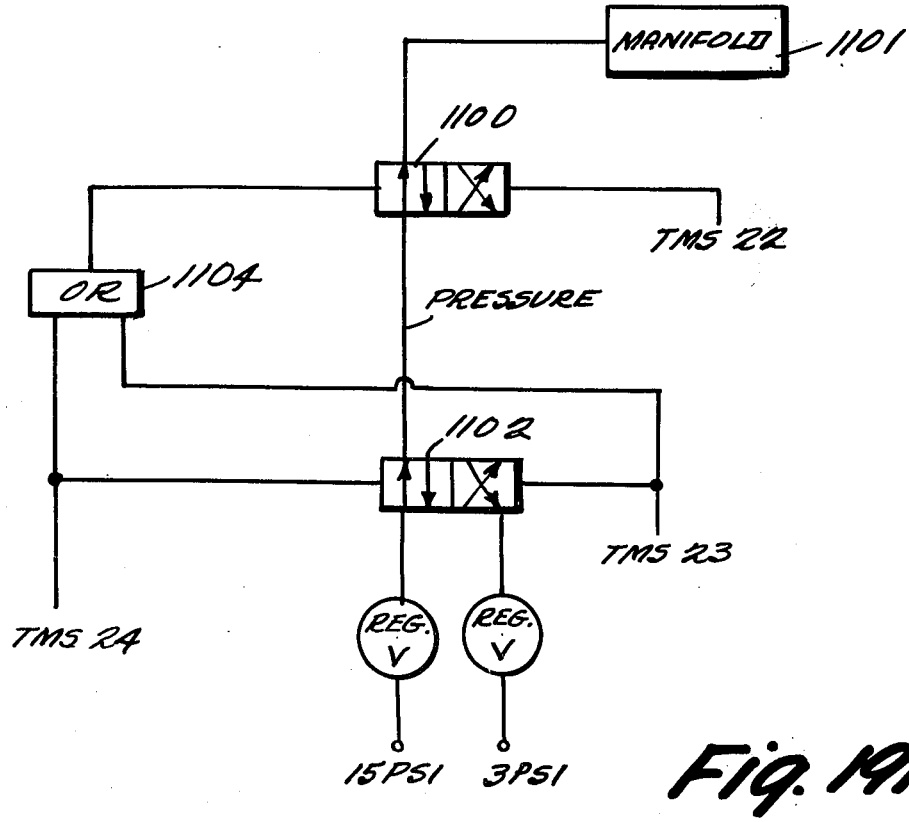
Figure 19G:
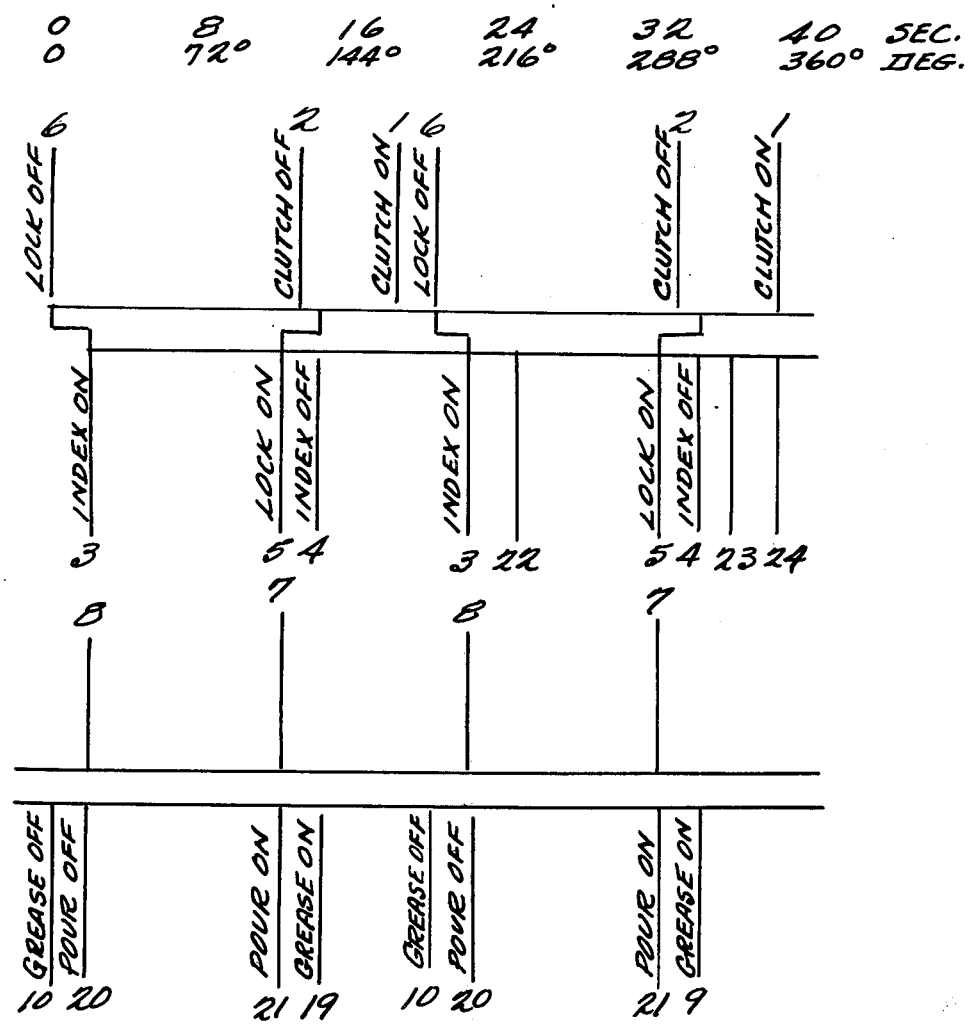

FIG. 19G illustrates schematically the times during the rotation of a timing motor (not shown) which controls when various control timing signals are produced. At the time indicated as TMS 3 an air signal indicating a logical one is applied as one input to AND gate 1000 in FIG. 19A. The other input to AND gate 1000 is connected to the output to AND gate 1002. AND gate 1002 in turn has one of its inputs connected to the output PMS 4 of the lock cylinder 72 which is shown in FIG. 3 and which is shifted between an unlocked and a locked position as described. When lock cylinder 72 is in the unlocked position, a positive logical one output is produced at the output PMS 4 and accordingly applied to AND gate 1002.

The other input to AND gate 1002 is connected to the output to AND gate 1004 which in turn receives as one of its inputs the logical signal PMS 6, which indicates that the mandrel which next receives a pipe has been properly greased. The other input to AND gate 1004 is from the pipe pour sensor 212 in FIG. 7 which indicates whether a pipe ready for pouring already has a collar. When all of these conditions are met, AND gate 1000 produces a logical one input to gate 1005.

The other input to gate 1005 is from AND gate 1006 which respectively receives inputs from gates 1007, and 1008. Gates 1007 and 1008 receives signals PMS 47 and PMS 87 in FIG. 21E and to ensure both loader 38 serving tables 22 and 24 are not at table 20.

When all of the conditions which are indicated by the inputs to gate 1005 have been satisfied, a logical one signal is produced causing flip-flop 1010 to shift into its illustrated position connecting hydraulic pressure to rotac 120 via restrictor 1014, flip-flop 1010, and flip-flop 1016. Flip-flop 1016 was previously shifted to its illustrated position ready to index by the air signal PMS 00 produced by cam 140 of the index drive 30 illustrated in detail in FIGS. 5 and 6 about half way through its travel. The return line for the hydraulic fluid applied to rotac 120 to cause rotation of same includes restrictors 1020 and 1022, flip-flop 1024 and flip-flop 1010. As rotac 120 rotates through its assigned angular distance, air signal PMS 1 which is produced when rotac 120 is in its fully returned position is followed by air signal PMS 2 and finally hydraulic signal PMS 3 when rotac 120 has reached the end of its forward rotation. The production of air signal PMS 2 causes flip-flop 1016 and 1010 as well as flip-flop 1024 to shift away from their illustrated positions so that rotac 120 is carried by the table momentum to the fully indexed position.

After rotac 120 begins moving, cam 140 shifts hydraulic valve 1026 away from its illustrated position creating a further path in parallel with restrictor 1022 to increase the rate of flow of hydraulic fluid through rotac 120 and to accelerate the same. When rotac 120 produces the signal PMS 2, roughly half way through its travel switch 1016 shifts away from its illustrated position cutting off the driving pressure and accordingly decelerating the rotac 120 which continues rotating by the table momentum until the switch PMS 3 is tripped. Rotac 120 now remains in its indexed position until time TMS 4 at which time AND gate 1030 produces a signal to shift flip-flop 1010 back to its illustrated position, assuming that the input PMS 5 is a logical one indicating that the lock cylinder 72 is in the locked position as can be seen in FIG. 19C. When gate 1030 produces output and flip-flop 1010 shifts away from its illustrated position, a reverse path is completed through rotac 120 via flip-flops 1016, 1010, and 1024 and check valve 1036 to return rotac 120 to its initial position.

FIG. 19B shows the logic for controlling clutch 142 between rotac 120 in FIGS. 5 and 6, and sprocket 126 which drives chain 130 which couples to the sprockets 180 of each of the respective mandrels 62 of urethane table 20. At time TMS 1 on the timing chart of FIG. 19G, a logical one signal is applied to AND gage 1050. If at this time a logical one signal PMS 1 is applied to AND gage 1050 on its other input, indicating that rotac 120 has properly returned to its initial position, flip-flop 1052 shifts from its illustrated position applying pressure to clutch 142 and preparing for operation of rotac 120. Similarly, at time TMS 2 in the timing chart of FIG. 19G, following indexing of rotac 120, AND gate 1054 produces an air signal. Assuming that rotac 120 is still in its rotated position, producing a signal at the input PMS 3 to AND gate 1054, flip-flop 1052 now shifts back to the illustrated position, decoupling air clutch 142 from the source of pressure and preventing indexing of the table 20 until flip-flop 1052 has shifted once again to its position connecting the pressure source to air clutch 142.

Referring now to FIG. 19C, the logic which controls the operation of the lock cylinder 72 is illustrated. Flip-flop 1060 controls which of the inputs to lock cylinder 72 is coupled to the pressure source and accordingly determines whether the cylinder is in an extended or retracted position. In the extended position a signal is produced at output PMS 55 and the table 20 is locked against further movement. In the retracted position, which results when flip-flop 1060 is in the illustrated position, table 20 is unlocked, ready for indexing and a logical one air signal is applied at output PMS 54.

At time TMS 6, just prior to time TMS 3 and the initiation of indexing, AND gate 1062 produces a signal which shifts flip-flop 1060 into its illustrated position, assuming that rotac is in the initial position producing an output signal at PMS 1 which is the other input to AND gate 1062. Similarly, following indexing, AND gate 1064 produces an output to shift flip-flop 1060 from its illustrated position and apply a hydraulic signal to cylinder 72 to cause that cylinder to shift into the lock position, assuming rotac 120 is now in the fully indexed position, producing an output PMS 3.

Referring now to FIG. 19D, the control circuitry for rotating the mandrel and pipe at the respective pouring, and greasing stations are illustrated. The motors which cause these rotations are each the hydraulic motor 266 shown in FIG. 8. At time TMS 7, which is the same as the time TMS 5 at which time table 20 is locked, AND gate 1080 produces a signal to shift flip-flop 1082 into its illustrated position and complete a hydraulic path to the hydraulic tank through each of the motors 266. The other input to AND gate 1080 is coupled to the PMS 3 output of the rotac 120 so that the motors 266 are operated only if rotac has properly indexed. At TMS 8, which is the same time as TMS 3, flip-flop 1072 is shifted away from its illustrated position and interrupting the hydraulic path through motors 266.

Reference is now made to FIG. 19E which illustrates the control circuit for the rotac 1090 which operates to apply grease to the mandrel 62 after a pipe has been unloaded from it and before another pipe is loaded thereon. Rotac 1090 rotates an arm mounting brush 304 which like arm 212 in FIG. 7 slides into the space 158 to apply grease to rotating mandrel 62 as shown in FIGS. 9 and 10. The greaser 36 thus operates like motor 215 and arm 212 in FIG. 7. At time TMS 10 just prior to indexing, flip-flop 1092 is shifted into the illustrated position to cause rotac 1090 to rotate in one direction and move the greaser arm up. Subsequently at time TMS 9, AND gate 1094 shifts flip-flop 1092 away from its illustrated position, provided a logical one is received at the PMS 5 input indicating that the table 20 is locked, to cause rotac 1090 to rotate in the opposite direction to advance its arm into the mandrel and apply grease to the interior surfaces.

Referring now to FIG. 19F, flip-flop 1100 controls the application of air pressure to air bag 160 of mandrel 62 via manifold 1101. As discussed above a small pressure, e.g. 3 psi is applied to air bag 160 to guide pipe 150 onto mandrel 62. The logic then increases the pressure, e.g. to 15 psi to hold pipe 150 firmly in place. Finally the pressure is completely released to permit transfer of pipes 105 to table 22 or 24.

At time TMS 22, flip-flop 1100 is shifted from its illustrated position to apply 0 psi to manifold 1101 which connects to the air bags via the respective quick action valves. The valve at unloading station 34 is operated at this time to release pipe 150 at that station.

Next, at time TMS 23, flip-flop 1102 is shifted from its illustrated position to apply 3 psi to the manifold. An air bag awaiting a pipe is then partially inflated as its quick connect valve is operated. Finally at TMS 24, flip-flop 1100 and 1102 are shifted back to their illustrated positions by OR gate 1104 apply 15 psi to the manifold 1101. An air bag on a mandrel with a pipe is then fully inflated by operation of its quick connect valve. The respective quick connect valves are operated by air cylinders activated following the change in pressure.

Reference is now made to FIG. 20 which illustrates the control logic for controlling operation of urethane pourer 32. Referring particularly to FIGS. 20A, pump motor 1103 is connected to the mixing chamber 200 of FIG. 7 for pumping the urethane components to chamber 200 from whence it is then pumped into the space 158 between mandrel 62 and pipe 150 in FIG. 4. Referring again to the timing chart illustrated in FIG. 19G, at time TMS 21, which concides with time TMS 7 and TMS 5, OR gate 1107 produces a signal which shifts flip-flop 1105 from its illustrated position, completing a hydraulic path from the pressure source through motor 1103 and back to the tank via flip-flop 1106 which at this time is in its illustrated position. A manual signal can also be produced and applied as input MMS 22 to flip-flop 1105 to cause the pouring pump to operate. At time TMS 20 which coincides with the time that indexing of table 20 is initiated, OR gate 1110 produces a signal which shifts flip-flop 1105 from its illustrated position and stops operation of hydraulic motor 1103.

Figure 20A:
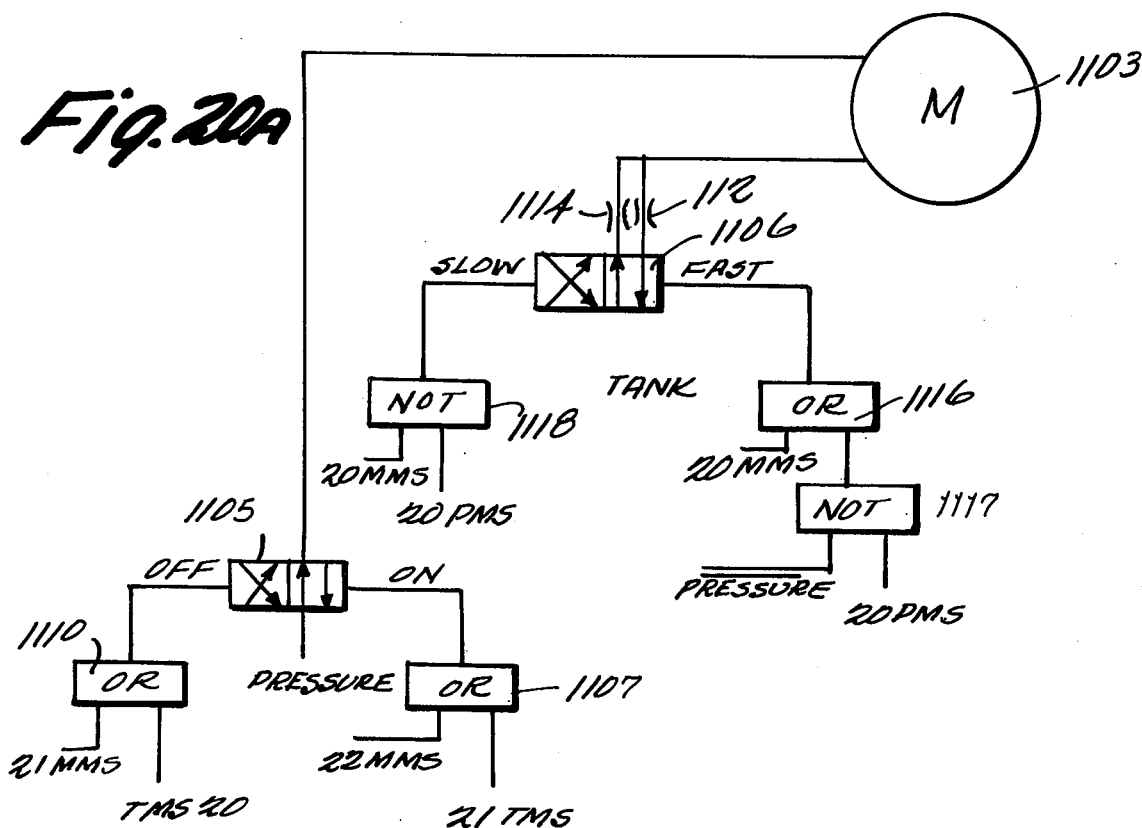
FIGS. 20A—20D show the control logic for operating the urethane pourer on the urethane table.
Figure 20B:
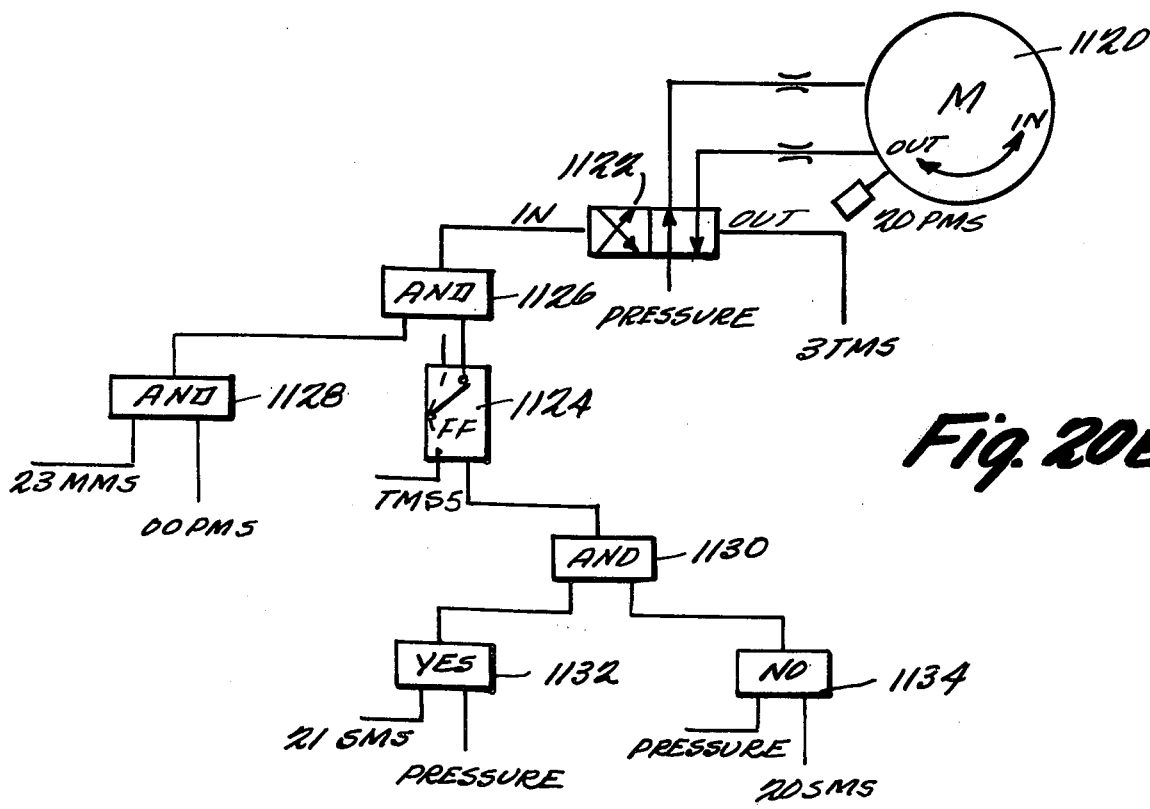

Pumping motor 1103 can operate at either a fast or slow speed to control the volume pumped, depending on the position of the flip-flop 1106. The motor is operated at a slow speed except while pouring, at which time it is operated at a high speed. Referring to FIG. 20B, output PMS 20 is produced when pouring arm 208 has swung to the withdrawn position awaiting table index. When output PMS 20 is low indicating the spout is in the pouring position, OR gate 1116 receives a high input from NOT gate 1117 and shifts flip-flop 1106 to its fast position. Similarly, when the pouring spout is not in position, the output of NOT gate 1118 shifts flip-flop 1106 into its slow position. Flip-flop 1106 can also be shifted by manual signals MMS 20. Restrictors 1112 and 1114 determine flow rates.

Referring now to FIG. 20B, rotac 1120 operates to control movement of arm 208 as it swings into and out of the position for dispensing liquid urethane. At time TMS 3, which corresponds with the initiating of indexing, flip-flop 1122 is shifted into its illustrated position to cause rotac 1120 to swing outward. Subsequently, at time TMS 5 which corresponds with the time in which the lock cylinder 72 is actuated to lock urethane table 20 firmly in place, flip-flop 1124 is shifted to cause AND gate 1126 to shift flip-flop 1122 away from its illustrated position and apply air pressure fluid to rotac 1120 to cause it to move in the opposite direction and to swing arm 208 into the position illustrated in FIG. 7 for pouring fluid into the mandrel.

The other input to AND gate 1126 is connected to AND gate 1128 which has its two inputs PMS 00 from the cam 140 in FIG. 19A and MMS 23 from a manual switch. AND gate 1130 provides an output signal permitting rotac 1120 to move to swing arm 208 inward only if sensor arm 212 in FIG. 7 has sensed that the pipe does not have a collar to produce signal SMS 21 and apply a logical one to AND gate 1130 via YES gate 1132 and sensor arm 214 in FIG. 7 has sensed that a pipe is present to not produce signal SMS 20 and apply a logical one via NOT gate 1134. Signal SMS 20 is produced when a pipe is not present.

Figure 20C:
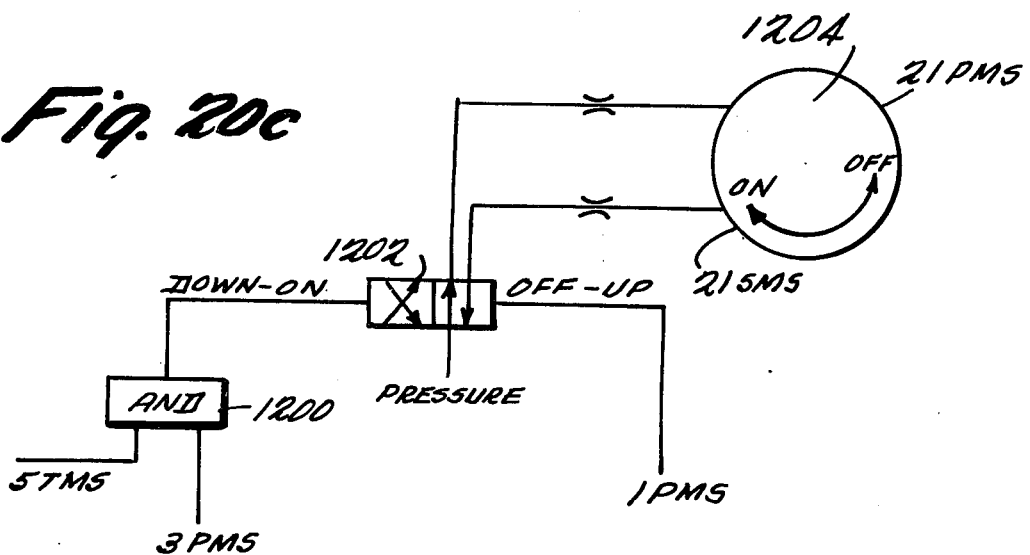

FIG. 20C illustrates a circuit for producing the sensor signals SMS 21 and PMS 21 indicating whether a pipe next to be poured has a collar. At time TMS 5, AND gate 1200 causes flip-flop 1202 to shift away from its illustrated position and cause rotac 1204 to move in a direction so as to cause sensor arm 21 to move downward. This occurs only if rotac 120 in FIG. 19A is in the fully indexed position to produce a PMS 3 input to AND gate 1200. Arm 212 is mounted for movement with pouring arm 208 as shown in FIG. 7. If the probe cannot be moved into the space 158 between mandrel 156 and pipe 150 in FIG. 4, then a signal is produced at SMS 21 which indicates that the pipe has not yet been poured and pouring can commence. When rotac 120 returns to its initial position as discussed above, a signal is produced as PMS 1 which causes flip-flop 1202 to return to its illustrated and accordingly causes rotac 1204 to rotate in the opposite direction and remove sensor arm 212 from space 158.

Figure 20D:
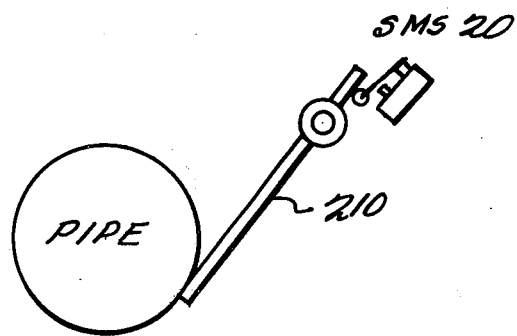

Referring to FIG. 20D, the sensor for the pipe functions similarly. Arm 210, which is mounted on arm 208 in FIG. 7, is rotated inwards until it encounters a pipe. If pipe is encountered, the arm continues inward until signal SMS 20 is produced. The movement of arm 210 is controlled by logic like that shown in FIG. 20C.

Figure 21A:
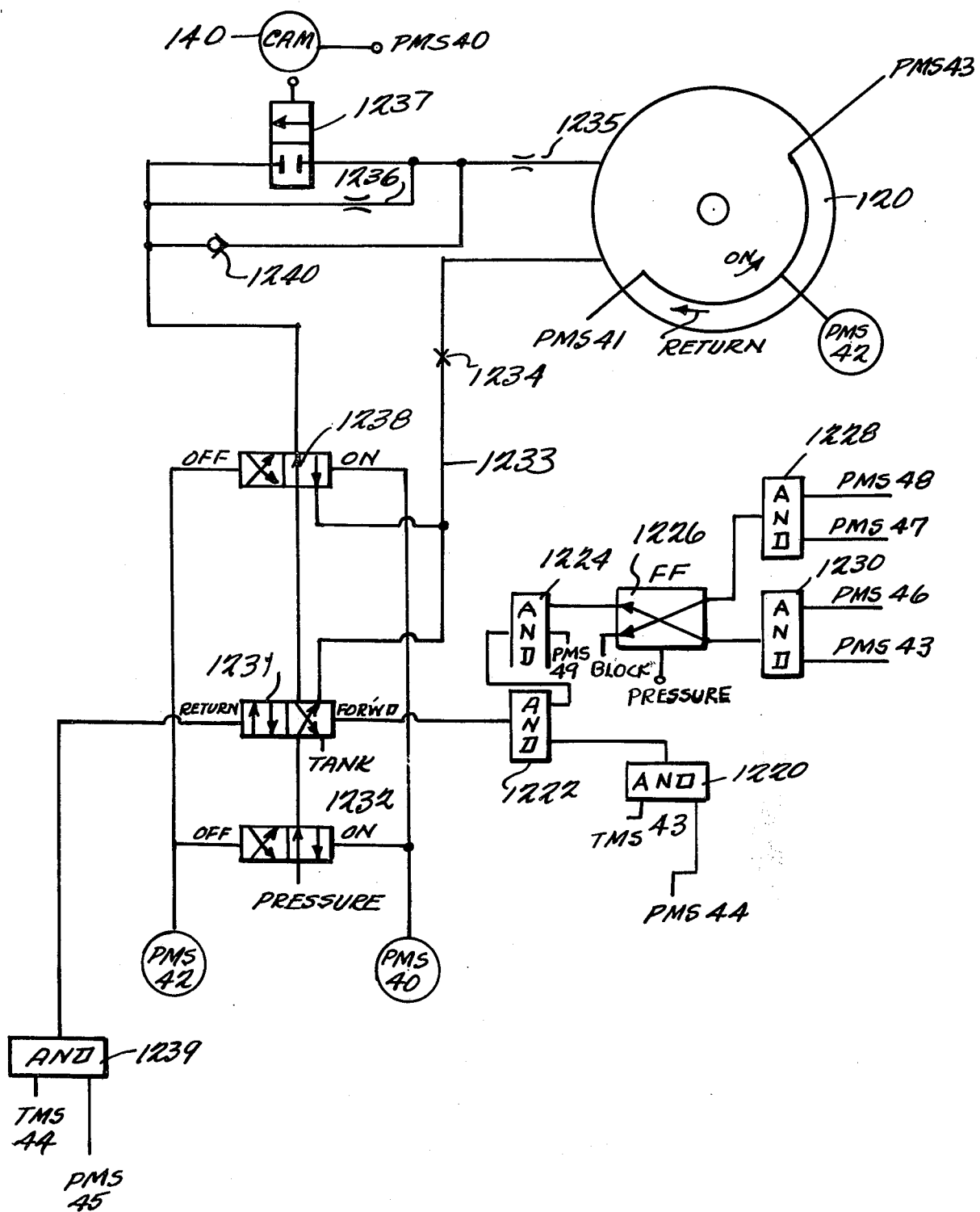

Reference is now made to FIG. 21 and particularly to FIG. 21A which illustrates the logic circuitry for controlling operation each of the winding tables 22 and 24. The motor which produces the timing signals for urethane table 20 also produces timing signals for winding tables 22 and 24 so that the two tables work in synchronization. The timing for each winding table is illustrated in FIG. 21K. It will be noted that urethane table 20 is indexed twice for each indexing of a winding table.

The circuitry of FIGS. 21A is essentially the same as the circuitry of FIG. 19A. Hydraulic device or rotac 120 is the rotac illustrated in FIGS. 5 and 6, and indexes chain 536 which engages sprockets 534 of mandrel 530 as can be seen in FIG. 14. At time TMS 43, provided that signal PMS 44 is a logical one, indicating that table 22 is unlocked, AND gate 1220 produces a logical one output signal which is applied to AND gate 1222. AND gate 1224 is enabled when PMS 49 is high indicating loader 38 is up and flip-flop 1226 provides a positive signal. Flip-flop 1226 in turn controlled by AND gates 1228 and 1230. Gate 1230 ensures that the sensed mandrel has a collar and that the loader is over table 22. Gate 1228 ensures that if loader 38 is over table 20, flip-flop 1226 will be blocked and indexing cannot occur. When flip-flop 1231 is in the illustrated position, a hydraulic path is completed through rotac 120 via flip-flops 1231, 1232, line 1233, restrictor 1234, rotac 120, restrictor 1235, restrictor 1236 and valve 1238, flip-flop 1238 and flip-flop 1231.

Signal PMS 42 shifts flip-flops 1232 and 1237 to cut off pressure drive so that rotac 120 coasts on the table momentum to the end of its travel. At time TMS-44, AND gate 1239 shifts flip-flop 1231 to generate a reverse flow path through rotac 120 via check valve 1240.

Figure 21B:
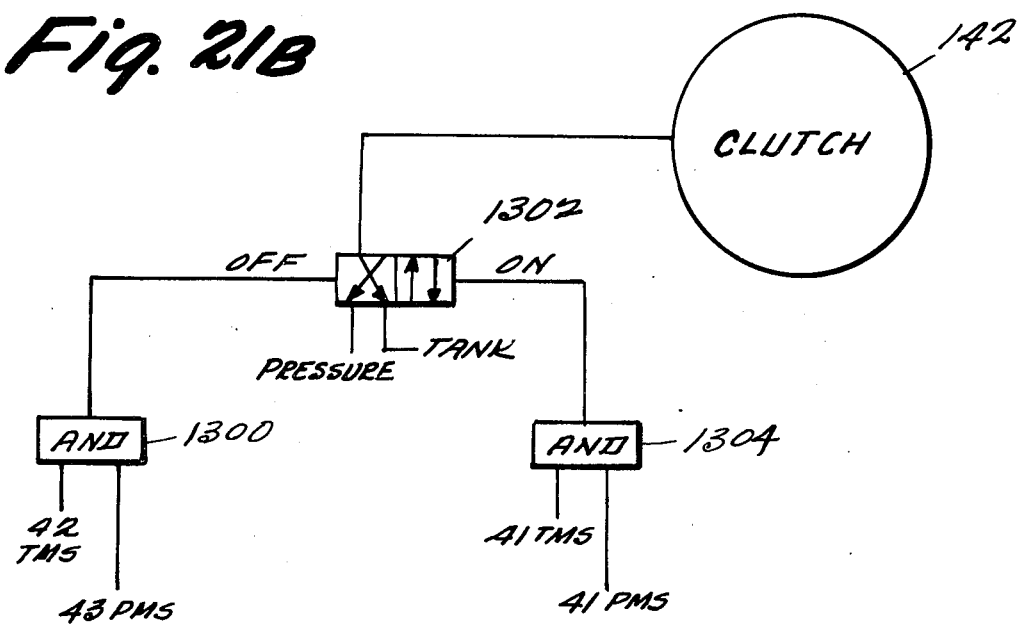

Referring to FIG. 21B, clutch 1422 must be released to permit rotac 120 in FIG. 21A to return to its initial position. This release occurs at time TMS 42 and occurs only if rotac 120 has been fully indexed to its rotated position to produce an output at PMS 43 and cause AND gate 1300 to produce an output to shift flip-flop 1302. Similarly at time TMS 41, provided rotac 120 is in its return position producing signal PMS 41, AND gate 1304 shifts flip-flop 1302 from its illustrated position and rotac 120 is ready to index.

Figure 21C:
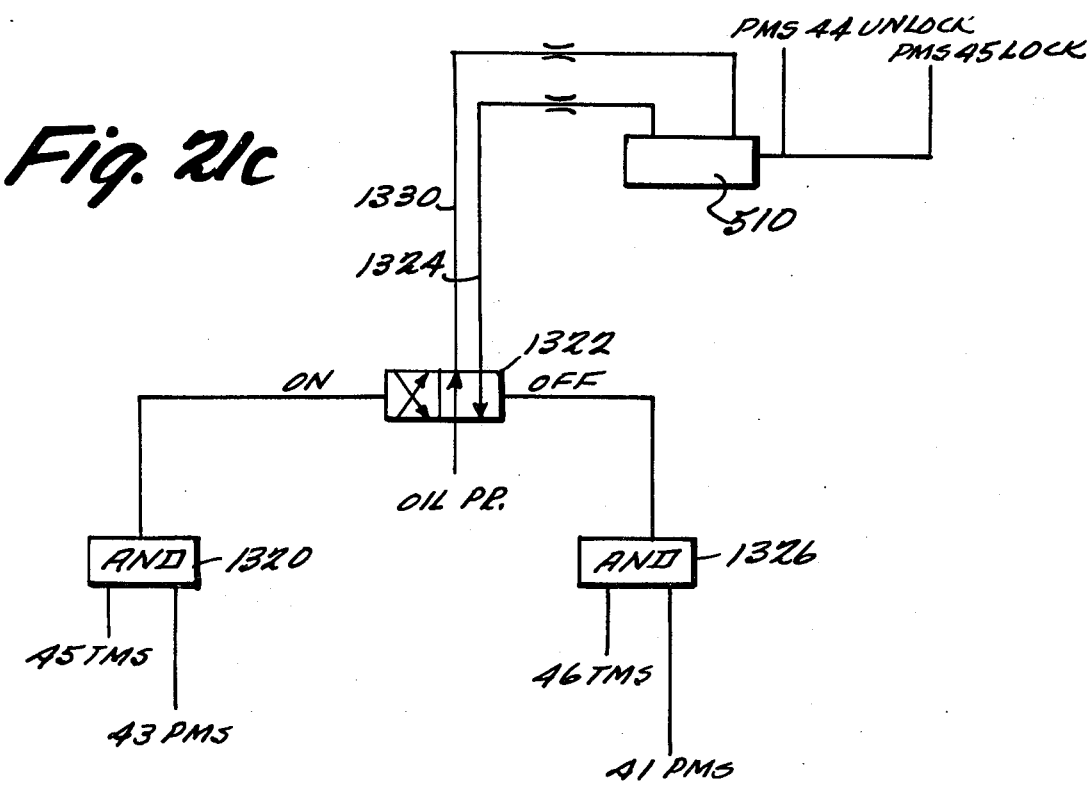

Referring now to FIG. 21C, the circuitry which controls lock cylinder 510 as shown in FIG. 13 is set forth. At time TMS 45, AND gate 1320 shifts flip-flop 1322 away from its illustrated position applying hydraulic pressure to line 1324 and causing hydraulic cylinder 510 to extend its controlled piston to the locked position, producing an output at PMS 45 and locking winding table 22 against further movement. This can occur only if rotac 120 has produced an output at PMS 43 indicating that full indexing has occured. Subsequently at time TMS 46, if rotac 120 has returned to its initial position to produce an output at PMS 41, AND gate 1326 shifts flip-flop 1322 back to its illustrated position to apply pressure to line 1330 and cause the lock cylinder 510 to retract to a position where indexing can occur and an output is produced at PMS 44.

Figure 21D:
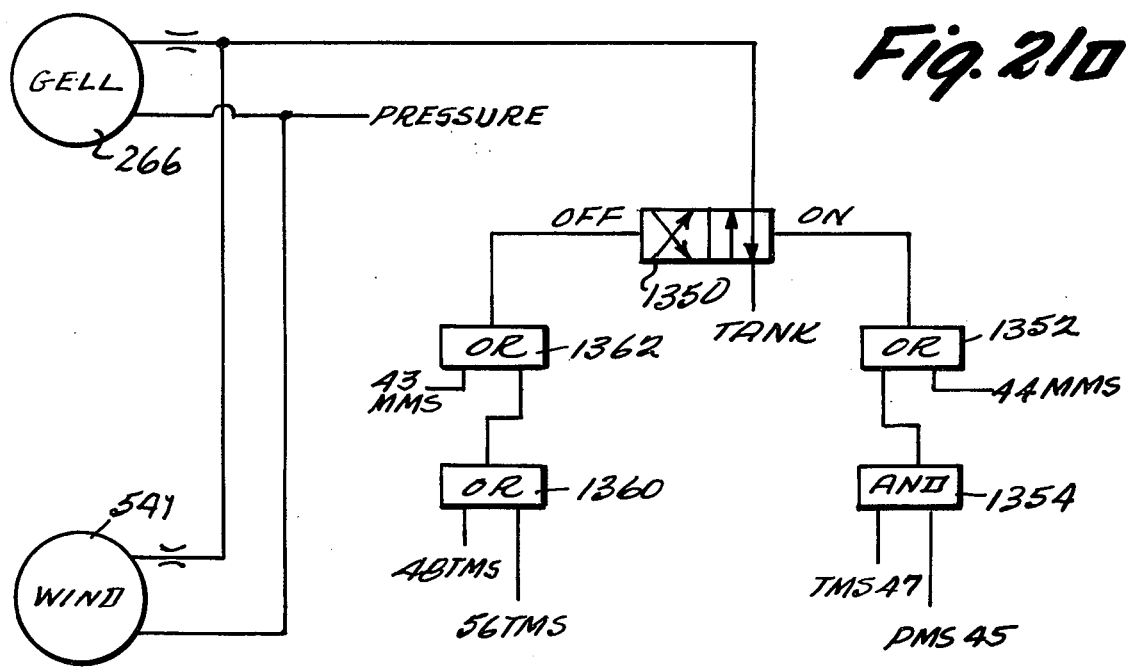

Referring now to FIG. 21D, flip-flop 1350 completes a hydraulic path from the pressure line to the tank through motor 266 as shown in FIG. 8 to drive the gel hydraulic motor to rotate the mandrel and pipe at that station and through motor 541 which rotates pipe 150 during winding. Motors 266 can be turned on by operation of a manual switch to produce signal MMS 44 to cause OR gate 1352 to produce an appropriate air signal. Alternatively, at time TMS 47, if the cylinder 510 has locked table 22 against further indexing, producing an output at PMS 45, AND gate 1354 applies an input to OR gate 1352 to cause motors 266 and 541 to be operative. Subsequently at time TMS 48 and/or at time TMS 56, OR gate 1360 produces an output which is applied to OR gate 1362 and which shifts flip-flop 1350 to disconnect the tank from the circuit and to stop operation of hydraulic motors 266 and 541. The other input to OR gate 1362 is connected to a manual switch producing signal MMS 43 which permits stopping of rotation of the respective motors at any time.

Figure 21E:
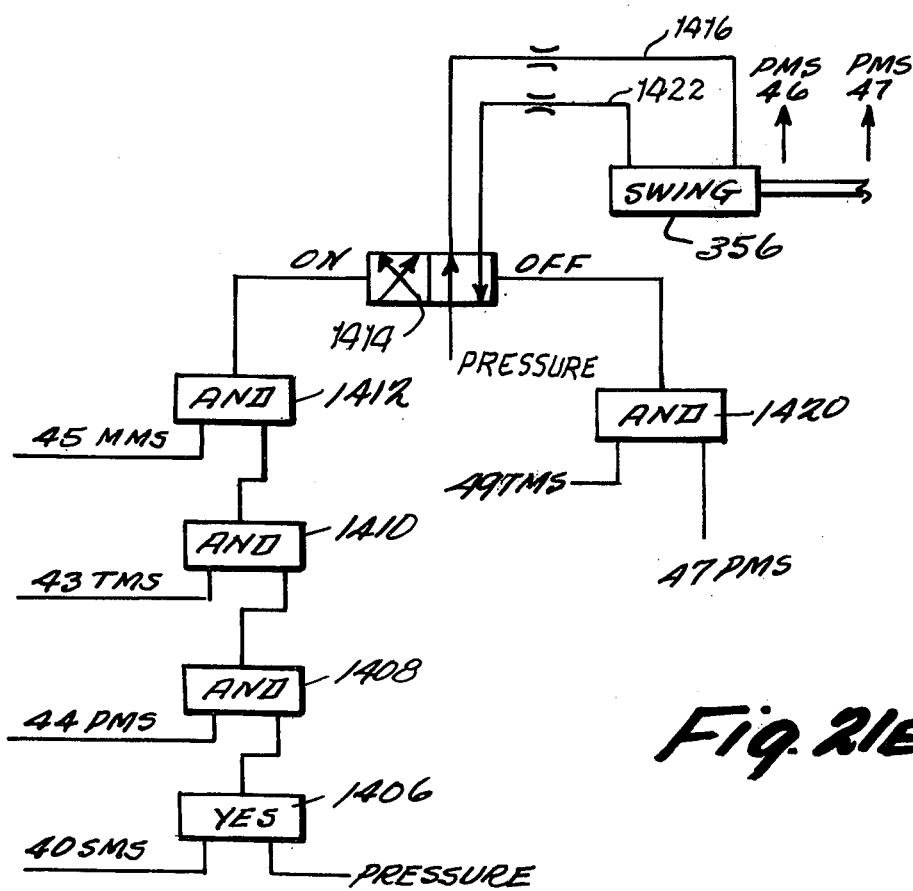

Reference is now made to FIG. 21E which illustrates the control circuitry for controlling switch device 356 for transfer loader 38. Swing device 356 is operated only if a pipe is present at the unloading station of urethane table 20 and a mandrel 62 is present at the loading station of indexing table 22. Sensors function in the same fashion as the sensors illustrated in FIG. 7 to provide respective signals SMS 40 and SMS 41 to indicate respectively the presence of a mandrel 62 and pipe at the proper locations.

Assuming that a pipe is present, gate 1406 in FIG. 21E applies a logical one input to AND gate 1408 which also receives as an input PMS 44 which indicates that lock cylinder 510 is in the withdrawn position as described above with reference to FIG. 21C. AND gate 1408 is connected to AND gate 1410 which produces a signal at TMS 43 and applies that signal to AND gate 1412. The other input to AND gate 1412 is a manual signal MMS 45 which can be operated to stop transfer. The signal produced by AND gate 1412 at time TMS 43, assuming that the system is operating properly, shifts flip-flop 1414 away from the illustrated position and applies hydraulic pressure to line 1416 to cause swing device 356 to extend and to swing horizontal beam 396 into a position over the pipe at the unloading station of urethane table 20. Subsequently at the time TMS 49, after the pipe at the unloading station has been grasped and lifted, AND gate 1420 shifts flip-flop 1414 back to the illustrated position, applying hydraulic pressure to line 1422 and causing swing device 356 to move back to its initial position producing an output at PMS 46 and moving the grasped pipe. after being turned end for end, over the unloading station of winding table 22 and the mandrel 530 that is located there. AND gate 1420 is shifted only if swing device 356 has been moved fully back to the urethane said, producing an output of PMS 47.

Figure 21F:
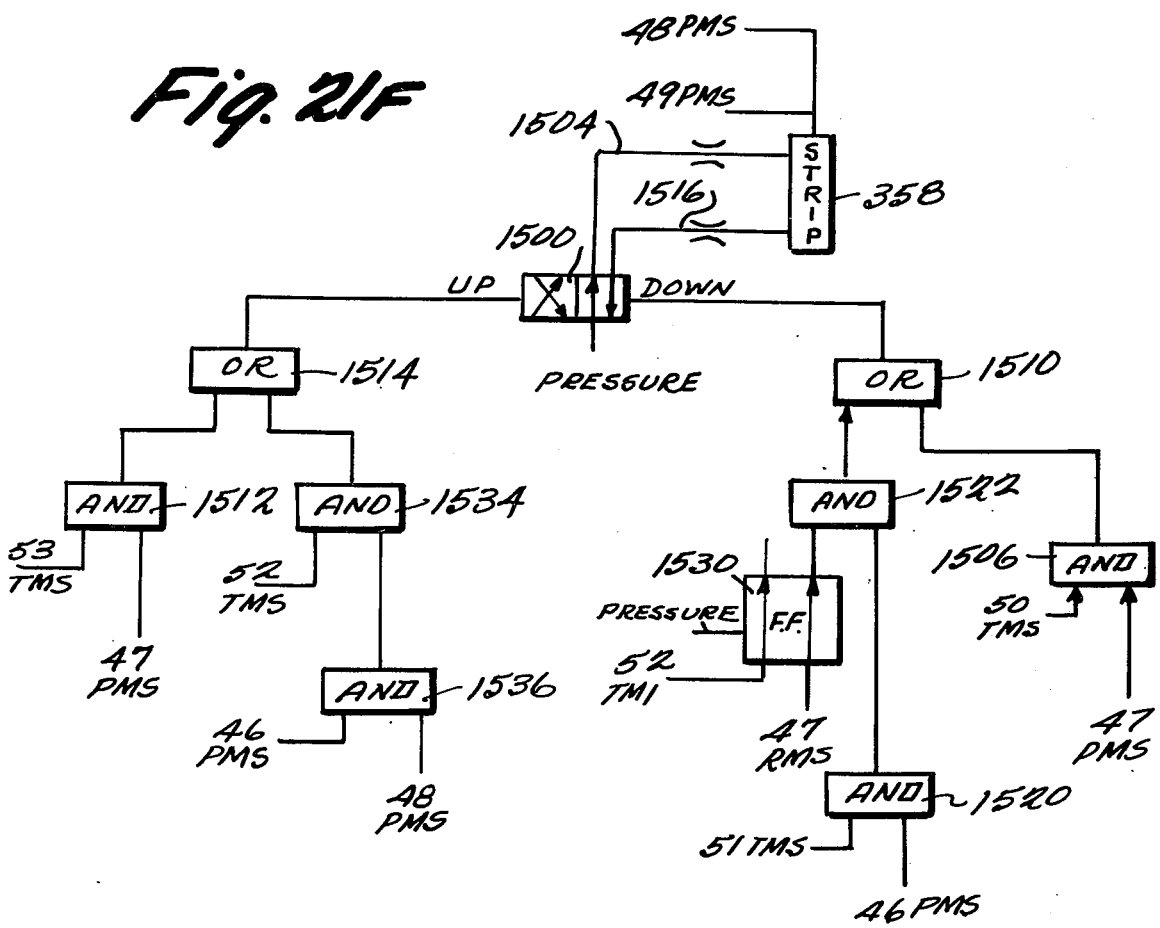

Reference is now made to FIG. 21F which illustrates the control circuitry for controlling operation of strip cylinder 358 which controls vertical movement of transfer loader 38 and the pipe which is grasped. After swing device 358 has shifted transfer loader 38 over pipe 150 on urethane table 20, flip-flop 1500 is shifted into the illustrated position to connect a pressure source to line 1504 and cause strip cylinder 358 to move downward to eventually produce, at the lowest position, output PMS 48. This occurs at time TMS 50 at which time AND gate 1506 produces an output which is applied as an input to OR gate 1510, provided that swing device 356 is on the urethane side, producing an output at PMS 47.

Subsequently, at time TMS 53, provided that the signal PMS 47 is still being produced, AND gate 1512 applies an input to OR gate 1514 which causes flip-flop 1500 to shift from its illustrated position and apply hydraulic pressure to line 1516 which in turn causes strip cylinder 358 to move upward until signal PMS 49 is produced. Loader 38 grasps a pipe between times 50 TMS and 53 TMS.

Next, at time TMS 51, if swing device 356 has moved the pipe over the unloading station at winding table 22, producing signal PMS 46, AND gate 1520 applies an input to AND gate 1522 which in turn applies an input to OR gate 1510 to shift flip-flop 1500 back to its illustrated position and again apply a hydraulic signal to line 1504 to cause strip cylinder 358 to move downward until signal PMS 48 is again produced. Thereafter, at time TMS 52, provided that the pipe is indeed over winding table 22, flip-flop 1503 shifts its output to the blocked output and to thereafter permit strip cylinder 358 to move upward after the pipe held on transfer loader 38 has been disengaged. This occurs at time TMS 52 at which time AND gate 1534 produces an output which shifts flip-flop 1500 away from its illustrated position, again applying hydraulic pressure to line 1516. The output of AND gate 1534 is conditioned upon AND gate 1536 producing a positive output signal, which event occurs only when the PMS 46 signal is being produced indicating that transfer loader 38 is over winding table 22 and the PMS 48 signal is being produced indicating that it is in a down position.

Figure 21G:
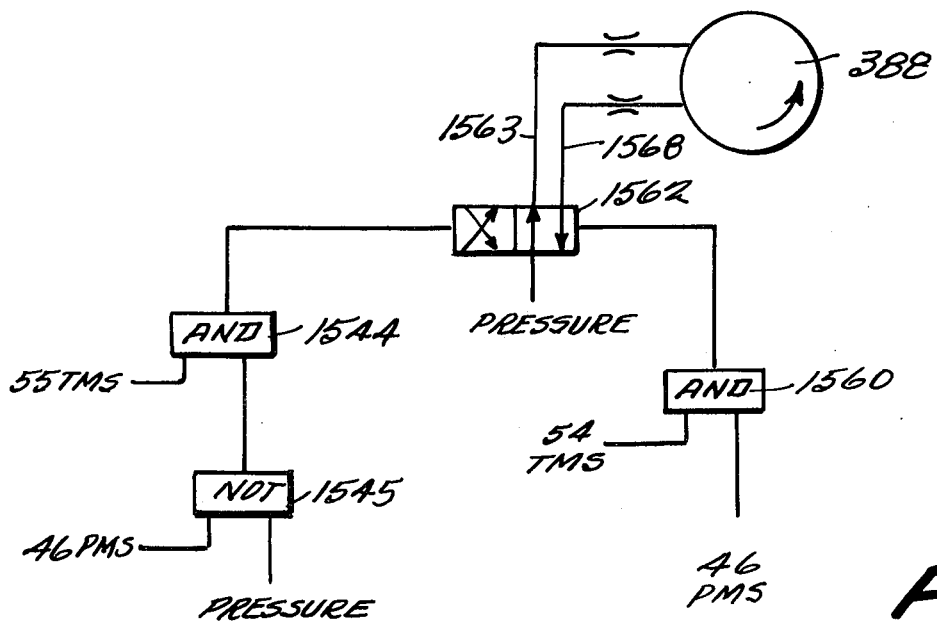

Reference is now made to FIG. 21G which illustrates the logic for controlling the turning end for end of a clay or other pipe held by transfer loader 38. This turning end for end occurs at time TMS 54 while swing device 356 has moved loader 38 over winding table 22, producing an output at PMS 46. When this occurs AND gate 1560 shifts flip-flop 1562 into the illustrated position to apply pressure to the rotac 388 on line 1563. Subsequently at time TMS 55, provided that the signal PMS 46 is still being produced to cause NOT gate 1545 to produce a logical one, AND gate 1544 produces an output to shift flip-flop 1562 away from its illustrated position and applying pressure to line 1568 to cause rotac 388 to return to its initial position. This, of course, occurs after the pipe has been deposited onto mandrel 530.

Figure 21H:
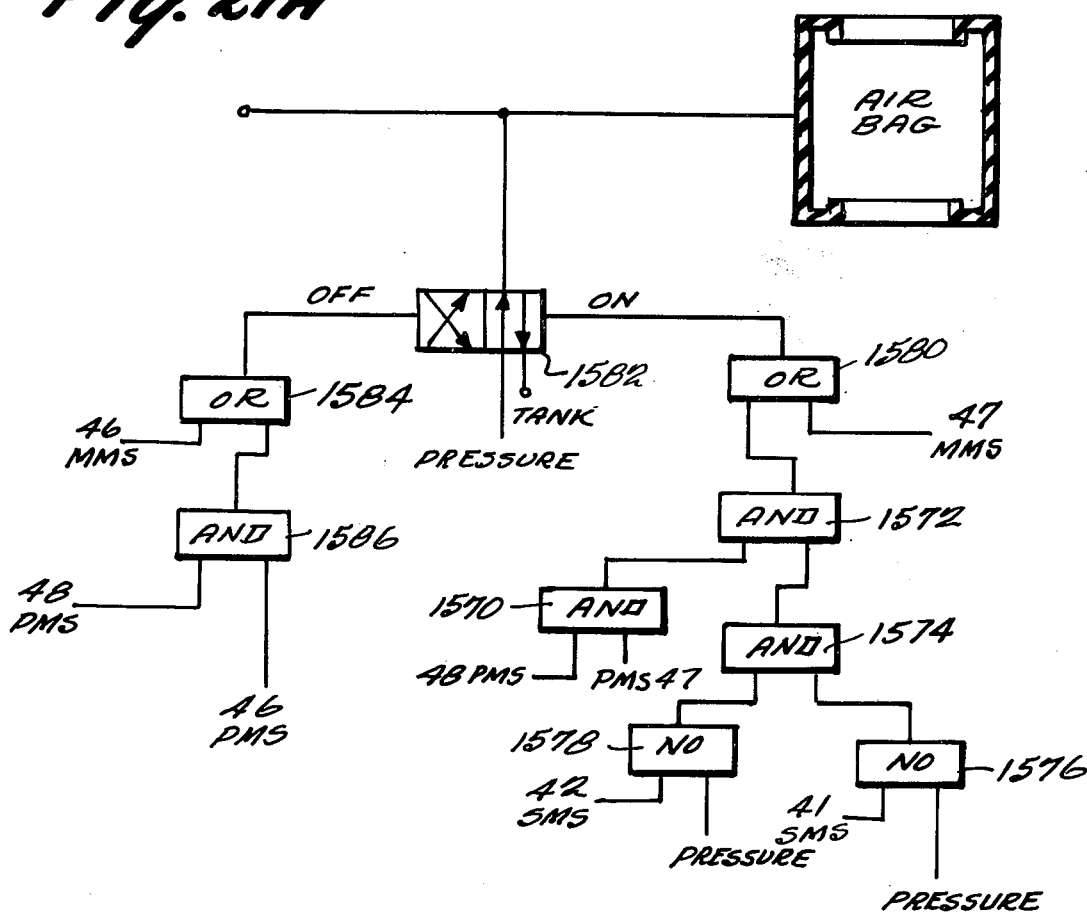

Reference is now made to FIG. 21H which illustrates the control circuitry for operating the air clamp 400 of transfer loader 38. When loader 38 is down at urethane table 20, inputs PMS 48 and PMS 47 to AND gate 1570 apply at logical one to one input to AND gate 1572. AND gate 1574 applies the other input to gate 1572 and has as its two inputs the outputs of NOT gates 1576 and 1578. NOT gate 1576 provides a one output when signal SMS 41 is low. Signal SMS 42 is produced only if a pipe on table 22 being checked has no collar. NOT gate 1578 similarly provides a one output when signal SMS 41 is low indicating a pipe is present. Signals SMS 41 and SMS 42 are produced by structure as shown in FIG. 7.

The output of AND gate 1572 is connected to OR gate 1580 which shifts flip-flop 1582 into the illustrated position to inflate the air bag of clamp 402. Manual switch signal MMS 47 also inflates the air bag.

When loader 38 is down at the winding table 22 or 24, signal PMS 46 and PMS 48 are high producing a one input to OR gate 1584 from AND gate 1586, shifting flip-flop 1582 away from its illustrated position and permitting the air bag to deflate.

Figure 21J:
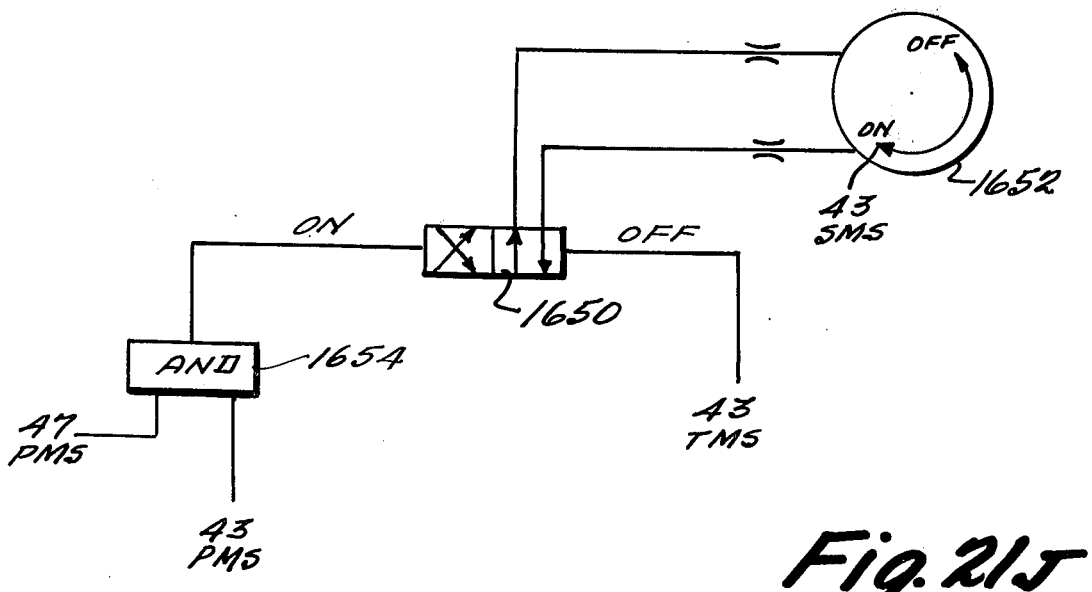

Reference is now made to FIG. 21J which illustrates the simple sensor circuitry for producing output signal SMS 42 to indicate whether the pipe at the unloading station of urethane table 20 has had an urethane collar formed thereon. At time TMS 43, flip-flop 1650 is shifted into the illustrated position to cause small rotac 1652 to return to its off position. Rotac 1652 moves an arm (not shown) in the same fashion as arm 208 in FIG. 7. When the swing cylinder on the urethane side produces a signal PMS 47 and rotac 120 has been fully indexed, producing signal PMS 43, AND gate 1654 shifts flip-flop 1650 away from its illustrated position, causing rotac 1652 to rotate an arm down into the space 158 where the urethane collar should exist. If rotac 1652 can pivot far enough to produce signals SMS 42, then no collar is present and air clamp 400 of transfer loader 38 cannot be operated.

Figure 21K:
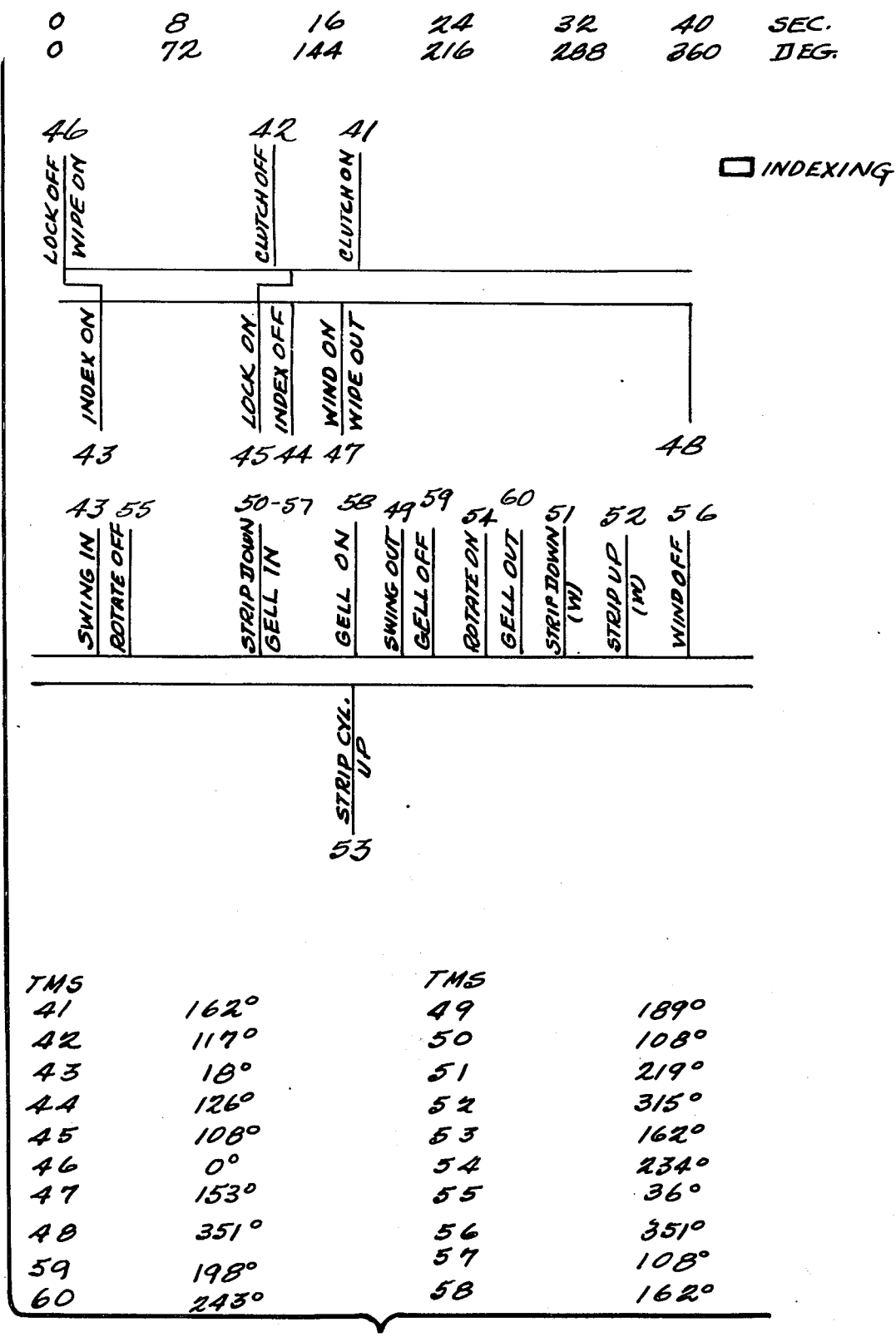

The timing for the circuitry of FIG. 21 is illustrated in FIG. 21K. These signals are preferably produced by the same timing motor producing the similar signals for urethane table 20. The circuitry for controlling the air bags on winding table 22 is similar to the circuitry for the bags on table 20 and is not detailed..

Figure 22A:
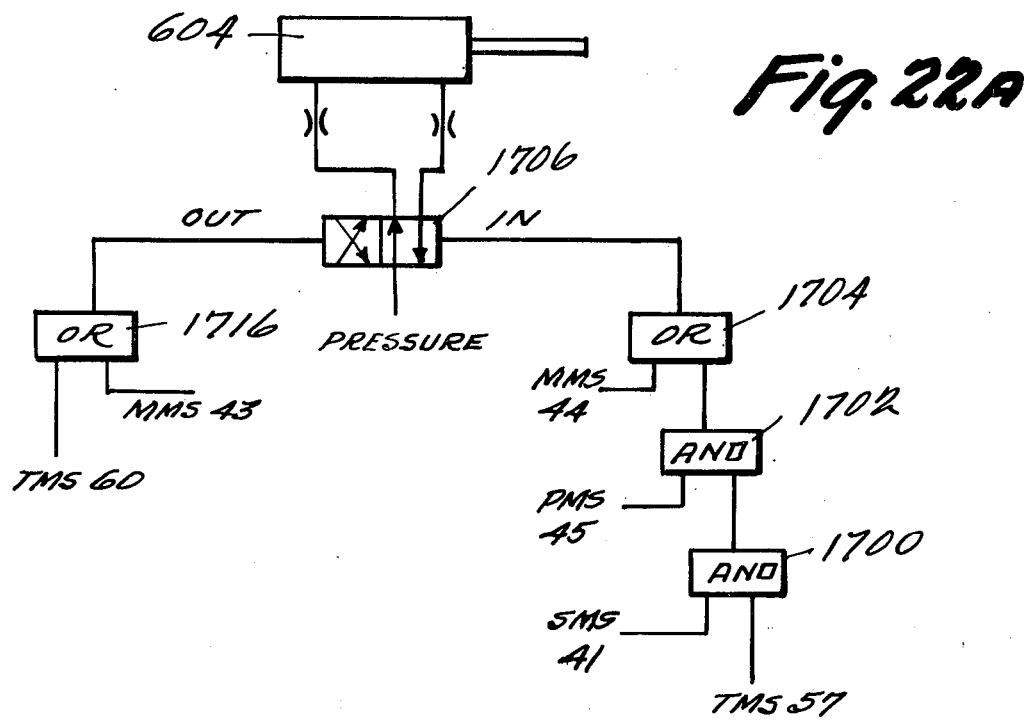
Figure 22B:
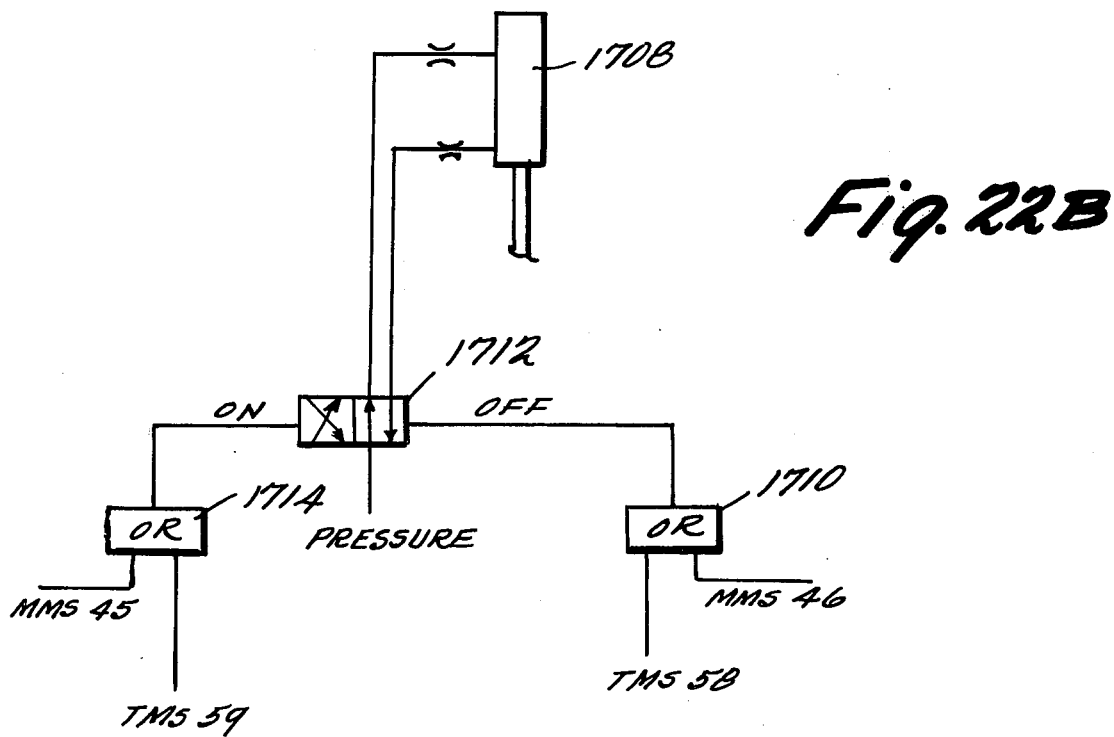

Reference is now made to FIGS. 22A and 22B which illustrate the logic for controlling gel coat applicator 42. The gel coat in effect is a polyester liner for the fiberglass bell which ensures that the interior surface of the bell will be smooth and, in addition, bridges gaps which often result between the mandrel and pipe because pipe ends are difficult to make exactly square. Without such a coating, the fiberglass rovings extend into the gap, making an unsatisfactory bell.

Cylinder 604, as also shown in FIG. 15, swings arm 606 toward and away from mandrel 530. At time TMS 57, provided that the signal SMS 41 indicates a pipe is present as shown in FIG. 7, AND gate 1700 applies a logical one to AND gate 1702 which also receives signal PMS 45 indicating the lock cylinder 510 is extended. The output of AND gate 1702 is applied via OR gate 1704 to flip-flop 1706 to cause pressure to be applied to cylinder 604 to swing arm 606 into pouring position.

Next, referring to FIG. 22B, cylinder 1708 opens and closes line 602 in FIGS. 15 and 16 by pinching and releasing the flexible line. At time TMS 58, OR gate 1710 shifts flip-flop 1712 into the illustrates position to release line 1708 and permit pouring to commence. Subsequently, at time TMS 59, OR gate 1714 shifts flip-flop 1712 away from its illustrated position to cause cylinder 1708 to pinch off line 602.

Finally referring again to FIG. 22A, at time TMS 60 OR gate 1716 causes flip-flop 1706 to shift away from its illustrated position and operate cylinder 604 to move arm 606 out of the pouring position.

Many changes and modifications can, of course, be made in the above described embodiment of the invention. Accordingly, the scope of the invention is limited only by the scope of the appended claims.

What is claimed is:

1. A method of forming on first and second tables a fiberglass bell on one end of a non fiberglass pipe having straight ends and a collar on the other end comprising:

mounting a plurality of pipes vertically including mounting said pipes on a first table and grasping said pipes about the lower end thereof, indexing said tables through a plurality of work stations, pouring liquid material at one of said stations of said first table about said lower end of a mounted pipe to form said collar, turning each said pipe end for end to an inverted vertical position after said collar is formed and with the end opposite said collar lowermost including transferring said pipes having collars to a second table, and forming a fiberglass bell at one of the stations of said second table about said lower end including rotating said pipe, applying a gel to said lower end, helically winding a plurality of fiberglass strands about said lower end, and heating the wound bell to cure.

2. A method as in claim 1 wherein said step of mounting includes mounting in a mandrel and including the step of applying grease to said mandrel prior to said mounting.

3. A method as in claim 1 wherein said step of transferring includes the steps of alternately transferring to one and then another of said second tables.

4. A method as in claim 1 including the step of locking said tables between indexing.

5. A system for forming a fiberglass bell on one end of a non fiberglass bell on one end of a non fiberglass pipe having straight ends and a collar on the other end comprising:

means for mounting a plurality of pipes vertically, means for pouring liquid material about the lower end of a mounted pipe to form said collar, means for turning each said pipe end for end to an inverted vertical position after said collar is formed and with the end opposite said collar lowermost, and means for forming a fiberglass bell about said lower end including means for winding a plurality of fiberglass strands about said lower end.

6. A system as in claim 5 wherein said mounting means includes a plurality of mandrels and each said mandrel includes means for supporting said pipe vertically on one end and means for grasping said pipe about said one end to hold the grasped pipe.

7. A system as in claim 6 wherein said grasping means includes an air bag and means for inflating and deflating said air bag.

8. A system as in claim 7 wherein each said mandrel includes a hollow shaft having a passageway for supplying air to said bag which is disposed about said shaft, and a flange for rotating said hollow shaft and any pipe supported on said mandrel.

9. A system as in claim 8 including means for engaging said flange to rotate a pipe supported on that mandrel.

10. A system as in claim 9 wherein said flange engaging means includes a resilient rotor member for contacting said flange and a hydraulic motor for rotating said resilient rotor member.

11. A system as in claim 8 further including a table for mounting said mandrels and means for successively indexing said table and wherein said mandrel further includes a fixed sprocket mounted about said hollow shaft and said indexing means each include a fixedly mounted hydraulic motor, a chain engaging said sprockets to rotate the same and timing means for periodically rotating said motor to cause rotation of said table through a predetermined angular displacement.

12. A system as in claim 11 wherein each table includes means for mounting said mandrels in a circle, wherein the number of stations is $n$ with $360/n$ being an integral number and wherein said angular displacement is $360/n°$.

13. A system as in claim 12 wherein said mounting means includes a fixed base, a central hub member rotatable with respect to said base, a plurality of ribs extending outward radially from said hub member, means for attaching a mandrel to each of said ribs, an annular ring attached to said ribs, a plurality of support rollers having an axis parallel to the radius of said central hub, and supporting said ring for rotation, and a plurality of brackets fixed to said base and each mounting one of said rollers for rotation.

14. A system as in claim 8 wherein said mounting means including a first table with said pouring means mounted adjacent thereto and a second table with said forming means mounted adjacent thereto and wherein the mandrels of said first table each include an annular ring member mounted about and fixed to said hollow shaft for movement along the axis of said shaft, said ring member having a horizontal surface for receiving a pipe end, spring means urging said shaft and ring member upwards, and a quick connect valve disposed in said passageway for supplying air to said bag.

15. A system as in claim 14 including means for locking each of said tables against indexing, means for releasing said locking means at a first time and subsequently causing locking at a subsequent time following indexing.

16. A system as in claim 15 wherein said locking means includes a hydraulic cylinder having a retractable and expandable piston arm, and means connected to said piston for engaging one of said mandrels to prevent rotation thereof.

17. A system as in claim 14 including transferring means for transferring pipes from said first to said second table, transfer means for grasping a pipe about the middle thereof between the ends, means for raising and lowering said transfer means, and means for swinging said transfer means in an arc between said tables.

18. A system as in claim 17 wherein said grasping means includes an air bag and means for mounting said air bag about the circumference of said pipe; wherein said raising and lowering means includes a first hydraulic cylinder having a piston, means fixedly mounted said cylinder to permit said piston to extend and retract and means for connecting said piston to said air bag mounting means and wherein said swinging means includes a second hydraulic cylinder.

19. A system as in claim 18 wherein said first cylinder mounting means includes a fixed base, a vertical beam pivotably connected to said base and means attaching said first cylinder to said base for permitting vertical movement of the first cylinder piston and wherein said connecting means includes a horizontal beam connected to said vertical beam, at least two rotatable members connected thereto, a bracket member, first and second chains connecting said piston to opposite sides of said bracket member via said rotatable members and means connecting said bracket member to said air bag mounting means.

20. A system as in claim 19 wherein said bracket member connecting means includes a hydraulic motor mounted on said bracket member, a chain driven thereby and at least one sprocket fixed on said air bag mounting means and engaging said chain to turn said pipe end-for-end.

21. A system as in claim 20 wherein said transferring means further includes a third hydraulic cylinder mounted on said horizontal beam between said first cylinder and said bracket member and having a piston movable vertically, a further sprocket mounted for vertical movement with said third cylinder piston and engaging said first and second chains to adjust the vertical position of said bracket for different pipe lengths.

22. A system as in claim 8 wherein said pouring means includes a chamber for mixing to form liquid urethane, a pouring spout; a flexible line connecting said spout to said chamber, a pivotable arm for mounting said line, and a hydraulic motor for pivoting said arm between a withdrawn position and a pouring position.

23. A system as in claim 8 wherein each said mandrel on said first table includes a member having a horizontal surface for receiving a pipe which rests vertically on said horizontal surface and which defines a collar mold between said pipe and member for receiving urethane from said spout.

24. A system as in claim 23 further including a first sensor for indicating by a first signal when a pipe is not present at a mandrel to be poured, a second sensor for indicating by a second signal when a collar is already about a pipe on a mandrel to be poured and means preventing pouring when said first or second signal is produced.

25. A system as in claim 23 further including means for rotating said mandrel during pouring.

26. A system as in claim 23 further including means for applying grease to said mandrel prior to receiving a pipe.

27. A system as in claim 26 further including means for rotating the mandrel and pipe during greasing, and wherein said applying means includes a grease hydraulic cylinder having a piston, means for mounting said grease cylinder for movement of said piston toward and away from said mandrel and pipe, a brush mounted on the end of said piston and means for supplying grease to said brush.

28. A system as in claim 22 further including heater means mounted adjacent said first table to cure said collar after pouring.

29. A system as in claim 5 including means for applying, prior to forming the bell, a chemical gel to said pipe about the region where said bell is to be formed and means for rotating the mandrel and pipe while said gel is being applied.

30. A system as in claim 29 wherein said bell forming means including a winding arm, means for mounting said arm adjacent said mandrel, means for rotating said mandrel and means for moving said arm vertically to cause helical winding of fiberglass filaments.

31. A system as in claim 30 wherein said mandrel rotating means includes a hydraulic motor and said arm moving means including a cam rotated by said motor and engaging said arm.

32. A system as in claim 30 including a heating means for curing the bell formed on each pipe.

33. A system as in claim 5 wherein said pouring means includes a pourer for pouring liquid urethane into a mold formed about said pipe between said pipe and said mounting means, fir means for moving said pourer, between a position for pouring and a withdrawn position, and means for rotating said mounting means and pipe during pouring and further including means for indexing said mounting means through a plurality of said stationary means for applying gel to the end of said pipe on which said bell is formed, second means for moving said applying means between a withdrawn and applying position, and means for rotating said mounting means and pipe during gel application and control means for operating said first and second mounting means, said gel applying means, indexing means and said bell forming means in accordance with a predetermined timing sequence.

34. A system as in claim 33 wherein said indexing means including a rotac and said control means includes hydraulic logic means connected to said rotac for applying hydraulic pressure thereto to cause indexing at a first time provided the system is operating normally and for applying pressure to cause said rotac to return at a subsequent time and gate means connected to said pressure applying means and having a plurality of condition establishing inputs for permitting indexing and return only under normal conditions.

35. A system as in claim 33 including means for locking said mounting means between indexing and wherein said control means locks and unlocks means at predetermined times.

36. A system for forming a fiberglass bell on one end of a non fiberglass pipe and a collar on the other end for mating with the bell of another pipe comprising:
a first table having a plurality of mandrels for each holding a pipe vertically at the bottom end thereof,
means for successively indexing said first table through a predetermined distance so as to successively present each pipe to each of a plurality of first table stations,
means disposed at one of said first table stations for forming said collar,
at least one second table having a plurality of mandrels for each holding a pipe at the bottom end thereof,
means for successively indexing said second table through a predetermined angular distance so as to successively present each pipe to each of a plurality of second table stations,
means for transferring pipes which have had a collar formed thereon from said first table to said second table and turning said pipe end for end during transfer, and
means disposed at one of said second table stations for winding a plurality of fiberglass strands about said mandrel and the pipe bottom adjacent thereto to form said bell.

37. A system as in claim 36 wherein said collar forming means includes means for pouring liquid urethane about the lower end of said pipe to form said collar.

38. A system as in claim 36 wherein each said mandrel includes means for supporting said pipe vertically on one end and means for grasping said pipe about said one end to hold the grasped pipe.

39. A system as in claim 38 wherein said grasping means includes an air bag and means for inflating and deflating said air bag.

40. A system as in claim 39 wherein each said mandrel includes a hollow shaft having a passageway for supplying air to said bag, which is disposed about said shaft, and a flange for rotating said hollow shaft and any pipe supported on said mandrel.

41. A system as in claim 40 including means mounted at at least some of said stations of each of said tables for engaging said flange to rotate a pipe supported on that mandrel.

42. A system as in claim 41 wherein said flange engaging means including a resilient rotor member for contacting said flange and a hydraulic motor for rotating said resilient rotor member.

43. A system as in claim 40 wherein said mandrel further includes a fixed sprocket mounted about said hollow shaft and said indexing means each include a fixedly mounted hydraulic motor, a chain engaging said sprockets to rotate the same and timing means for periodically rotating said motor to cause rotation of said table through a predetermined angular displacement.

44. A system as in claim 43 wherein each table includes means for mounting said mandrels in a circle, wherein the number of stations is $n$, with $360/n$ being an integral number and wherein said angular displacement is $360/n°$.

45. A system as in claim 44 wherein said mounting means includes a fixed base, a central hub member rotatable with respect to said base, a plurality of ribs extending outward radially from said hub member, means for attaching a mandrel to each of said ribs, an annular ring attached to said ribs, a plurality of support rollers having an axis parallel to the radius of said central hub, and supporting said ring and a plurality of brackets fixed to said base and each mounting one of said rollers for rotation.

46. A system as in claim 40 wherein the mandrels of said first table each include an annular ring member mounted about and fixed to said hollow shaft for movement along the axis of said shaft, said ring member having a horizontal surface for receiving a pipe end, spring means urging said shaft and ring member upwards, and a quick connect valve disposed in said passageway for supplying air to said bag.

47. A system as in claim 36 including means for locking each of said tables against indexing, means for releasing said locking means at a first time and subsequently causing locking at a subsequent time following indexing.

48. A system as in claim 47 wherein said locking means includes a hydraulic cylinder having a retractable and expandable piston arm, and means connected to said piston for engaging one of said mandrels to prevent rotation thereof.

49. A system as in claim 36 wherein said transferring means includes transfer means for grasping a pipe about the middle thereof between the ends, means for raising and lowering said transfer means, and means for swinging said transfer means in an arc between said tables.

50. A system as in claim 49 wherein said grasping means includes an air bag and means for mounting said air bag about the circumference of said pipe, wherein said raising and lowering means includes a first hydraulic cylinder having a piston, means fixedly mounting said cylinder to permit said piston to extend and retract and means for connecting said piston to said air bag mounting means and wherein said swinging means includes a second hydraulic cylinder.

51. A system as in claim 50 wherein said first cylinder mounting means includes a fixed base, a vertical beam pivotably connected to said base and means attaching said first cylinder to said base for permitting vertical movement of the first cylinder piston and wherein said connecting means includes a horizontal beam connected to said vertical beam, at least two rotatable members connected thereto, a bracket member, first and second chains connecting said piston to opposite sides of said bracket member via said rotatable members and means connecting said bracket member to said air bag mounting means.

52. A system as in claim 50 wherein said bracket member connecting means includes a hydraulic motor mounted on said bracket member, a further chain driven thereby and at least one sprocket fixed on said air bag mounting means and engaging said further chain to turn said pipe end for end.

53. A system as in claim 52 wherein said transferring means further includes a third hydraulic cylinder mounted on said horizontal beam between said first cylinder and said bracket member and having a piston movable vertically, a further sprocket mounted for vertical movement with said third cylinder piston and engaging said first and second chains to adjust the vertical position of said bracket for different pipe lengths.

54. A system as in claim 36 wherein said collar forming means includes a chamber for mixing to form liquid urethane, a pouring spout, a flexible line connecting said spout to said chamber, a pivotable arm for mounting said line, and a hydraulic motor for pivoting said arm between a withdrawn position and a pouring position.

55. A system as in claim 54 wherein each said mandrel on said first table includes a member having a horizontal surface for receiving a pipe which rests vertically on said horizontal surface and which defines a collar mold between said pipe and member for receiving urethane from said spout.

56. A system as in claim 55 further including a first sensor for indicating by a first signal when a pipe is not present at a mandrel to be poured, a second sensor for indicating by a second signal when a collar is already about a pipe on a mandrel to be poured and means preventing pouring when said first or second signal is produced.

57. A system as in claim 55 further including means for rotating said mandrel during pouring.

58. A system as in claim 46 further includes means for applying grease to a mandrel after a pipe has been transferred and before another pipe is placed thereon.

59. A system as in claim 58 further including means for rotating mandrel and pipe during grease application, and wherein said applying means includes a grease hydraulic cylinder having a piston, means for mounting said grease cylinder for movement of said piston toward and away from said mandrel and pipe, a brush means mounted on an end of said piston and means for supplying grease to said brush.

60. A system as in claim 54 further including heater means mounted at stations of first table to which said first table is indexed after pouring.

61. A system as in claim 36 wherein each said second table includes means for applying, prior to winding, a chemical gel to said pipe about the region where said strands are to be wound and means for rotating the mandrel and pipe while said gel is being applied.

62. A system as in claim 61 wherein said winding means including a winding arm, means for mounting said arm adjacent said mandrel, means for rotating said mandrel and means for moving said arm vertically to cause helical winding.

63. A system as in claim 62 wherein said mandrel rotating means includes a hydraulic motor and said arm moving means includes a cam rotated by said motor and engaging said arm.

64. A system as in claim 62 including heating means mounted adjacent said second table for curing the bell formed on each pipe.

65. A system as in claim 36 including at least two separate second tables.

66. A system as in claim 36 including a control logic for controlling indexing of said tables.

67. A system as in claim 36 wherein said collar forming means includes a pourer for pouring liquid urethane into a mold formed about said pipe between said pipe and said mandrel, first means for moving said pourer between a position for pouring and a withdrawn position, and means for rotating said mandrel and pipe during pouring and further including means disposed on said second table for applying gel to the end of said pipe about which said filaments are wound, second means for moving said applying means between a withdrawn and an applying position, means for rotating said mandrel and pipe during gel application and control means for operating said first and second moving means, said gel applying means, said indexing means for each of said tables, said transferring means and said winding means in accordance with a predetermined timing sequence.

68. A system as in claim 67 wherein said indexing means including a rotac and means coupling said rotac to said table for rotating same and said control means includes hydraulic logic means connected to said rotac for applying hydraulic pressure thereto to cause indexing at a first time provided the system is operating normally and for applying pressure to cause said rotac to return at a subsequent time and gate means connected to said pressure applying means and having a plurality of condition establishing inputs for permitting indexing and return only under normal conditions.

69. A system as in claim 67 including means for locking each of said tables between indexing and wherein said control means locks and unlocks said locking means at predetermined times.

70. A system as in claim 67 wherein said transferring means includes means for grasping a pipe, lifting the grasped pipe from said first table, turning the lifted pipe, swinging the lifted pipe over said second table and lowering said pipe.

* * * * *